US007398226B2

(12) United States Patent
Haines et al.

(10) Patent No.: US 7,398,226 B2
(45) Date of Patent: **\*Jul. 8, 2008**

(54) SYSTEM AND METHOD FOR NETWORKED LOYALTY PROGRAM

(75) Inventors: Mark Haines, Madison, NJ (US); Raymond R. Ferrell, West Orange, NJ (US); Fauziah Ariff, New York, NY (US); Theodore S. Voltmer, Caldwell, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 1178 days.

This patent is subject to a terminal disclaimer.

(21) Appl. No.: 10/010,947

(22) Filed: Nov. 6, 2001

(65) Prior Publication Data

US 2003/0033211 A1 Feb. 13, 2003

Related U.S. Application Data

(63) Continuation-in-part of application No. 09/836,213, filed on Apr. 17, 2001.

(60) Provisional application No. 60/279,817, filed on Mar. 29, 2001, provisional application No. 60/246,208, filed on Nov. 6, 2000.

(51) Int. Cl.
*G06Q 30/00* (2006.01)

(52) U.S. Cl. .............................. 705/14; 705/26; 705/27
(58) Field of Classification Search ........................ None
See application file for complete search history.

(56) References Cited

U.S. PATENT DOCUMENTS 4,910,672 A 3/1990 Off et al.

(Continued)

FOREIGN PATENT DOCUMENTS

EP 0308224 3/1989

(Continued)

OTHER PUBLICATIONS

Fallon: "UK Retailers' Loyal Customer 'Card Wars' Prove Costly (most major retailers in the UK have grown their sales over the past 2 years by launching loyalty-card programs)"; Supermarket News, May 5, 1997; vol. 47, No. 18, p. 57.

(Continued)

*Primary Examiner*—Raquel Alvarez
(74) *Attorney, Agent, or Firm*—Snell & Wilmer L.L.P.

(57) ABSTRACT

The present invention provides a system for implementing a purchaser incentive program on a network-wide level. The system associates SKU and UPC data on a network level to provide consumers with a purchasing environment that is both convenient and cost-efficient. The association of SKU and UPC data at a network level also provides consumers with the ability to analyze their own purchase data for a variety of purposes, including analyses relating to the consumer's spending behaviors or patterns for example. In accordance with one aspect of the invention, the association of UPC and SKU data by the system facilitates a network-wide search for an item that a consumer desires to purchase under terms or conditions that are selected by the consumer and are therefore perceived to be optimal by that consumer. In accordance with another aspect of the invention, the association of UPC and SKU data by the system facilitates data analysis by a consumer based upon any of several factors, including items purchased, prices for those items, retailer ID, SKU number, UPC, manufacturer ID, and/or the like. The system may compile any of the above data across multiple entities for the purpose of data analysis, such as analyses which may be employed in consumer budgeting for example.

6 Claims, 14 Drawing Sheets

U.S. PATENT DOCUMENTS

| | | |
|---|---|---|
| 5,025,372 A | 6/1991 | Burton et al. |
| 5,056,019 A | 10/1991 | Schultz et al. |
| 5,117,355 A | 5/1992 | McCarthy |
| 5,128,752 A | 7/1992 | Von Kohorn |
| 5,173,851 A | 12/1992 | Off et al. |
| 5,200,889 A | 4/1993 | Mori |
| 5,201,010 A | 4/1993 | Deaton et al. |
| 5,202,826 A | 4/1993 | McCarthy |
| 5,233,514 A | 8/1993 | Ayyoubi et al. |
| 5,237,620 A | 8/1993 | Deaton et al. |
| 5,256,863 A | 10/1993 | Ferguson et al. |
| 5,287,268 A | 2/1994 | McCarthy |
| 5,305,196 A | 4/1994 | Deaton et al. |
| 5,327,508 A | 7/1994 | Deaton et al. |
| 5,353,218 A | 10/1994 | De Lapa et al. |
| 5,382,779 A | 1/1995 | Gupta |
| 5,388,165 A | 2/1995 | Deaton et al. |
| 5,424,524 A | 6/1995 | Ruppert et al. |
| 5,430,644 A | 7/1995 | Deaton et al. |
| 5,434,394 A * | 7/1995 | Roach et al. ................ 235/375 |
| 5,448,471 A | 9/1995 | Deaton et al. |
| 5,467,269 A | 11/1995 | Flaten |
| 5,471,669 A | 11/1995 | Lidman |
| 5,483,444 A | 1/1996 | Heintzeman et al. |
| 5,491,326 A | 2/1996 | Marceau et al. |
| 5,513,102 A | 4/1996 | Auriemma |
| 5,535,407 A | 7/1996 | Yanagawa et al. |
| 5,537,314 A | 7/1996 | Kanter |
| 5,592,560 A | 1/1997 | Deaton et al. |
| 5,612,868 A | 3/1997 | Off et al. |
| 5,621,812 A | 4/1997 | Deaton et al. |
| 5,638,457 A | 6/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,659,469 A | 8/1997 | Deaton et al. |
| 5,673,322 A | 9/1997 | Pepe et al. |
| 5,675,662 A | 10/1997 | Deaton et al. |
| 5,687,322 A | 11/1997 | Deaton et al. |
| 5,689,100 A | 11/1997 | Carrithers et al. |
| 5,708,782 A | 1/1998 | Larson et al. |
| 5,710,886 A | 1/1998 | Christensen et al. |
| 5,729,693 A | 3/1998 | Holda-Fleck |
| 5,734,838 A | 3/1998 | Robinson et al. |
| 5,742,845 A | 4/1998 | Wagner |
| 5,749,075 A | 5/1998 | Toader |
| 5,761,648 A | 6/1998 | Golden et al. |
| 5,765,141 A | 6/1998 | Spector |
| 5,774,868 A | 6/1998 | Cragun et al. |
| 5,774,869 A | 6/1998 | Toader |
| 5,774,870 A | 6/1998 | Storey |
| 5,806,043 A | 9/1998 | Toader |
| 5,806,044 A | 9/1998 | Powell |
| 5,806,045 A | 9/1998 | Biorge et al. |
| 5,816,918 A | 10/1998 | Kelly et al. |
| 5,832,457 A | 11/1998 | O'Brien et al. |
| 5,832,458 A | 11/1998 | Jones |
| 5,839,117 A | 11/1998 | Cameron et al. |
| 5,845,259 A | 12/1998 | West et al. |
| 5,848,399 A | 12/1998 | Burke |
| 5,855,007 A | 12/1998 | Jovicic et al. |
| 5,857,175 A | 1/1999 | Day et al. |
| 5,864,822 A | 1/1999 | Baker, III |
| 5,870,722 A | 2/1999 | Albert et al. |
| 5,884,277 A | 3/1999 | Khosla |
| 5,892,827 A | 4/1999 | Beach et al. |
| 5,898,838 A | 4/1999 | Wagner |
| 5,903,874 A | 5/1999 | Leonard et al. |
| 5,903,880 A | 5/1999 | Biffar |
| 5,905,246 A | 5/1999 | Fajkowski |
| 5,905,908 A | 5/1999 | Wagner |
| 5,907,830 A | 5/1999 | Engel et al. |
| 5,907,831 A | 5/1999 | Lotvin et al. |
| 5,909,023 A | 6/1999 | Ono et al. |
| 5,913,210 A | 6/1999 | Call |
| 5,915,007 A | 6/1999 | Klapka |
| 5,915,243 A | 6/1999 | Smolen |
| 5,915,244 A | 6/1999 | Jack et al. |
| 5,918,211 A | 6/1999 | Sloane |
| 5,918,213 A | 6/1999 | Bernard et al. |
| 5,918,214 A | 6/1999 | Perkowski |
| 5,923,016 A | 7/1999 | Fredregill et al. |
| 5,933,811 A | 8/1999 | Angles et al. |
| 5,937,391 A | 8/1999 | Ikeda et al. |
| 5,937,394 A | 8/1999 | Wong et al. |
| 5,938,727 A | 8/1999 | Ikeda |
| 5,950,173 A | 9/1999 | Perkowski |
| 5,956,695 A | 9/1999 | Carrithers et al. |
| 5,970,469 A | 10/1999 | Scroggie et al. |
| 5,971,277 A | 10/1999 | Cragun et al. |
| 5,974,398 A | 10/1999 | Hanson et al. |
| 5,978,777 A | 11/1999 | Garnier |
| 5,979,757 A | 11/1999 | Tracy et al. |
| 5,983,196 A | 11/1999 | Wendkos |
| 5,983,205 A | 11/1999 | Brams |
| 5,991,376 A | 11/1999 | Hennessy et al. |
| 5,991,736 A | 11/1999 | Ferguson et al. |
| 5,992,738 A | 11/1999 | Matsumoto et al. |
| 5,992,752 A | 11/1999 | Wilz, Sr. et al. |
| 5,995,942 A | 11/1999 | Smith et al. |
| 5,999,914 A | 12/1999 | Blinn et al. |
| 6,000,608 A | 12/1999 | Dorf |
| 6,002,771 A | 12/1999 | Nielsen |
| 6,003,013 A | 12/1999 | Boushy et al. |
| 6,007,426 A | 12/1999 | Kelly et al. |
| 6,009,411 A | 12/1999 | Kepecs |
| 6,009,412 A | 12/1999 | Storey |
| 6,012,038 A | 1/2000 | Powell |
| 6,012,039 A | 1/2000 | Hoffman et al. |
| 6,012,051 A | 1/2000 | Sammon, Jr. et al. |
| 6,014,634 A | 1/2000 | Scroggie et al. |
| 6,014,635 A | 1/2000 | Harris et al. |
| 6,015,344 A | 1/2000 | Kelly et al. |
| 6,018,718 A | 1/2000 | Walker et al. |
| 6,024,640 A | 2/2000 | Walker et al. |
| 6,026,370 A | 2/2000 | Jermyn |
| 6,026,375 A | 2/2000 | Hall et al. |
| 6,026,377 A | 2/2000 | Burke |
| 6,032,136 A | 2/2000 | Brake, Jr. et al. |
| 6,035,280 A | 3/2000 | Christensen |
| 6,035,281 A | 3/2000 | Crosskey et al. |
| 6,039,244 A | 3/2000 | Finsterwald |
| 6,041,308 A | 3/2000 | Walker et al. |
| 6,041,309 A | 3/2000 | Laor |
| 6,047,269 A | 4/2000 | Biffar |
| 6,049,778 A | 4/2000 | Walker et al. |
| 6,049,779 A | 4/2000 | Berkson |
| 6,055,573 A | 4/2000 | Gardenswartz et al. |
| 6,058,371 A | 5/2000 | Dijan |
| 6,061,660 A | 5/2000 | Eggleston et al. |
| 6,064,979 A | 5/2000 | Perkowski |
| 6,076,101 A | 6/2000 | Kamakura et al. |
| 6,092,069 A | 7/2000 | Johnson et al. |
| 6,101,483 A | 8/2000 | Petrovich et al. |
| 6,101,484 A | 8/2000 | Halbert et al. |
| 6,101,485 A | 8/2000 | Fortenberry et al. |
| 6,105,001 A | 8/2000 | Masi et al. |
| 6,128,599 A | 10/2000 | Walker et al. |
| 6,129,274 A | 10/2000 | Suzuki |
| 6,134,318 A | 10/2000 | O'Neil |
| 6,134,548 A | 10/2000 | Gottsman et al. |
| 6,138,911 A | 10/2000 | Fredregill et al. |
| 6,161,096 A | 12/2000 | Bell |
| 6,164,533 A | 12/2000 | Barton |

| | | |
|---|---|---|
| 6,173,267 B1 | 1/2001 | Cairns |
| 6,178,407 B1 | 1/2001 | Lotvin et al. |
| 6,178,408 B1 | 1/2001 | Copple et al. |
| 6,185,541 B1 | 2/2001 | Scroggie et al. |
| 6,196,458 B1 | 3/2001 | Walker et al. |
| 6,216,129 B1 | 4/2001 | Eldering |
| 6,222,914 B1 | 4/2001 | McMullin |
| 6,236,978 B1 | 5/2001 | Tuzhilin |
| 6,243,688 B1 | 6/2001 | Kalina |
| 6,249,772 B1 | 6/2001 | Walker et al. |
| 6,251,017 B1 | 6/2001 | Leason et al. |
| 6,267,672 B1 | 7/2001 | Vance |
| 6,292,786 B1 * | 9/2001 | Deaton et al. ............ 705/14 |
| 6,332,126 B1 | 12/2001 | Peirce et al. |
| 6,332,157 B1 * | 12/2001 | Mighdoll et al. ............ 709/217 |
| 6,334,111 B1 | 12/2001 | Carrott |
| 6,336,098 B1 | 1/2002 | Fortenberry et al. |
| 6,386,444 B1 | 5/2002 | Sullivan |
| 6,450,407 B1 | 9/2002 | Freeman et al. |
| 6,484,147 B1 | 11/2002 | Brizendine et al. |
| 6,532,448 B1 | 3/2003 | Higginson et al. |
| 6,594,640 B1 | 7/2003 | Postrel |
| 6,687,679 B1 | 2/2004 | Van Luchene et al. |
| 6,721,743 B1 | 4/2004 | Sakakibara |
| 6,748,365 B1 | 6/2004 | Quinlan et al. |
| 6,820,061 B2 | 11/2004 | Postrel |
| 6,829,586 B2 | 12/2004 | Postrel |
| 6,842,739 B2 | 1/2005 | Postrel |
| 6,947,898 B2 | 9/2005 | Postrel |
| 7,127,414 B1 * | 10/2006 | Awadallah et al. ............ 705/26 |
| 2001/0032137 A1 | 10/2001 | Bennett et al. |
| 2002/0013728 A1 | 1/2002 | Wilkman |
| 2002/0062253 A1 | 5/2002 | Dosh, Jr. et al. |
| 2002/0069150 A1 | 6/2002 | Ni |
| 2002/0082918 A1 | 6/2002 | Warwick |
| 2002/0082920 A1 | 6/2002 | Austin et al. |
| 2002/0152116 A1 | 10/2002 | Yan et al. |
| 2003/0061097 A1 | 3/2003 | Walker et al. |
| 2003/0229584 A1 | 12/2003 | Brown |
| 2004/0019522 A1 | 1/2004 | Bortolin et al. |
| 2004/0068438 A1 | 4/2004 | Mitchell et al. |
| 2004/0128197 A1 | 7/2004 | Bam et al. |
| 2004/0215505 A1 | 10/2004 | Sullivan |
| 2004/0262381 A1 | 12/2004 | Mesaros |

FOREIGN PATENT DOCUMENTS

| | | |
|---|---|---|
| WO | WO9926176 | 5/1999 |
| WO | WO9930256 | 6/1999 |
| WO | WO9952051 | 10/1999 |
| WO | WO9960503 | 11/1999 |
| WO | WO0014665 | 3/2000 |
| WO | WO0033159 | 6/2000 |
| WO | WO0033222 | 6/2000 |
| WO | WO0101282 | 1/2001 |

* cited by examiner

SYSTEM AND METHOD FOR NETWORKED LOYALTY PROGRAM

CROSS REFERENCE TO RELATED APPLICATIONS

This application claims priority to, and is a continuation-in-part of, U.S. patent application Ser. No. 09/836,213, filed Apr. 17, 2001 and entitled "System and Method for Networked Loyalty Program", which claims priority to, and the benefit of, U.S. Provisional Patent Application Ser. No. 60/279,817, filed Mar. 29, 2001 and entitled "System and Method for Networked Incentive Awards Program". This application also claims priority to, and the benefit of, U.S. Provisional Patent Application Ser. No. 60/246,208, filed Nov. 6, 2000 and entitled "Virtually Complete Purchasing". This application hereby incorporates by reference each of these prior applications in their entireties.

FIELD OF THE INVENTION

The present invention relates generally to purchaser incentive programs and, more specifically, to the capture of retailer item identifiers and the matching of such retailer item identifiers with corresponding manufacturer item identifiers to facilitate, for example, a network-wide search for an item based upon a consumer's search criteria, as well as an analysis by a consumer of the consumer's purchase data.

BACKGROUND

Incentive award programs have been developed in a variety of industries to promote customer loyalty. Generally, such programs reward customers for repeat business with the same merchant or service provider by accumulating reward points which can then be redeemed in a plurality of ways, including exchanging the reward points for additional goods and services that may be selected from an approved list or a redemption catalog, for example. The reward points are usually calculated using a predetermined formula or ratio that relates a customer's purchase volume (i.e., in terms of money value or some other volume parameter) to a certain number of reward points. For example, reward points may be issued on a one-for-one basis with each dollar that a customer spends on particular goods and services.

One well-known example of a customer incentive program is a "frequent flyer" program which rewards airlines passengers with "mileage points" based upon the distances that the passengers fly with a particular airline. The mileage points may then be redeemed for free airfare or free car rentals. Other incentive award programs are designed to induce usage of particular financial instruments, such as credit cards or debit cards, by accumulating reward points or dollar value points based upon the volume of purchases made using the particular financial instrument. These types of programs may be designed such that customers of the financial institution accumulate reward points which can be redeemed for selected goods or services or, alternatively, such that customers accumulate points which have a dollar value which can be applied toward a credit or debit balance, depending on whether the instrument is a credit or debit instrument, for example.

These and other similar incentive award programs are described in U.S. Pat. Nos. 5,774,870 and 6,009,412, issued to Thomas W. Storey and assigned to Netcentives, Inc., both of which are hereby incorporated by reference to the extent that they describe an automated rewards system. For more information on loyalty systems, transaction systems, electronic commerce systems, and digital wallet systems, see, for example: the Shop AMEX™ system as disclosed in Ser. No. 60/230,190 filed Sep. 5, 2000; the MR as Currency™ and Loyalty Rewards Systems as disclosed in Ser. No. 60/197,296 filed on Apr. 14, 2000, Ser. No. 60/200,492 filed Apr. 28, 2000, and Ser. No. 60/201,114 filed May 2, 2000; a digital wallet system as disclosed in U.S. Ser. No. 09/652,899 filed Aug. 31, 2000; a stored value card as disclosed in Ser. No. 09/241,188 filed on Feb. 1, 1999; a system for facilitating transactions using secondary transaction numbers as disclosed in Ser. No. 09/800,461 filed on Mar. 7, 2001; and also in related provisional applications Ser. No. 60/187,620 filed Mar. 7, 2000, Ser. No. 60/200,625 filed Apr. 28, 2000, and Ser. No. 60/213,323 filed May 22, 2000; all of which are herein incorporated by reference. Other examples of online membership reward systems are disclosed in U.S. Pat. No. 5,774,870, issued on Jun. 30, 1998, and U.S. Pat. No. 6,009,412, issued on Dec. 29, 1999, both of which are hereby incorporated by reference. A further example of a loyalty and reward program may be found at the AIR MILES® Web site (www.airmiles.ca), which describes a loyalty program offered by The Loyalty Group, a privately held division of Alliance Data Systems of Dallas, Tex., and which is hereby incorporated by reference. Additional information relating to smart card and smart card reader payment technology is disclosed in Ser. No. 60/232,040, filed on Sep. 12, 2000, and U.S. Pat. Nos. 5,742,845, 5,898,838 and 5,905,908, owned by Datascape; all of which are hereby incorporated by reference. Information on point-of-sale systems and the exploitation of point-of-sale data is disclosed in U.S. Pat. No. 5,832,457, issued on Nov. 3, 1998 to O'Brien et al., which is hereby incorporated by reference.

Portions of each of the above-described programs may be used to induce customer loyalty to particular merchants or service providers who directly provide goods or services to the consumer. In other words, these prior art frequency awards programs provide a means for retail businesses, financial institutions, and others in direct contact with the customers they service to provide incentives to their customers to encourage repeat and/or volume business. However, these programs do not sufficiently address the similar needs of businesses that are further up in the distribution chain, such as manufacturers, to promote volume purchases by customers based upon, for example, brand loyalty independent of the retail source for the purchase. Additionally, the prior art programs do not provide a means for monitoring, tracking, and/or analyzing consumer and product data across distribution channels for a particular manufacturer and/or the variety of goods which that manufacturer places into the stream of commerce for ultimate sale to consumers by a retailer.

Generally, before a product arrives at a retail establishment for sale to a consumer, the product travels through a distribution chain which originates with the manufacturer. The manufacturer typically sells its products to a wholesaler who in turn sells those products to various retailers. Most modem retailers implement some form of computerization or electronic technology in their day-to-day operations. This technology typically consists of using point-of-sale (POS) systems for automating checkout procedures, assisting sales personnel, and the like. POS systems generally include one or more automated check-out terminals which are capable of inputting or sensing and interpreting a symbol or other indicia related to the product, such as a Universal Product Code (UPC), generally comprising a machine-readable bar code coupled with a human-readable UPC number, that is printed on a label or tag which is placed on each item of merchandise to be purchased. The manufacturer may assign and mark each product that it sells with a UPC. Conventionally, once the product reaches the retailer, the retailer further identifies each product with a Stock Keeping Unit (SKU) number or code as well as other information for identifying a specific item or style of merchandise. The retailer's SKU number may be either an entirely different number used to identify each product (e.g., by style) or a modified version of the manufacturer's UPC number, derived, perhaps, by adding a SKU number to the UPC number, for example.

A POS terminal, a kiosk terminal, or a sales person's handheld terminal might be coupled to a store computer system, such as a network server or some other store platform host, which is able to recognize and process UPC and/or SKU information which has been manually keyed-in or sensed and interpreted by a device, such as a barcode reader, coupled to the terminal. The computer system typically includes a database which stores information relating to the retailer's product inventory, such as stocked merchandise, a UPC and/or SKU number for each item of merchandise, and various types of merchandise identification information, such as price, inventory, style, color, size, etc., which is associated with each UPC and/or SKU number. When a customer purchases an item of merchandise, store personnel frequently use an automated terminal to read the barcode markings which are attached to the item. A computer interprets the UPC and/or SKU number comprised by the barcode, accesses the database to determine the price for each item, and maintains a running total of the total transaction price.

One problem that results from the independent identification schemes of the manufacturer and the retailers is that there is no way for the manufacturer to track the quantity of any particular product that each retailer sold. For example, even if a manufacturer obtains all of the SKU numbers representing items purchased from Retailer 1 and Retailer 2 by consumers, the manufacturer has no means for determining which SKU number corresponds to the manufacturer's UPC, since the UPC's and SKU numbers of the various retailers are not tracked and matched.

In view of the foregoing, a need exists for an incentive or loyalty program which overcomes the shortcomings of the prior art. Thus, there is a need for a system and method which provides a universal customer incentive program that networks various levels of the product distribution chain, such as manufacturers, wholesalers, and retailers, to provide incentives to consumers to purchase products not only from a particular merchant or group of merchants but also from particular manufacturers, who are not necessarily related to the specific merchant who sells the manufacturer's products to the consumer. Additionally, a need exists for a system and method for gathering data which associates particular consumer purchasing behaviors and specific products or product criteria across a manufacturer's distribution channels.

SUMMARY OF THE INVENTION

The present invention provides a system for implementing a purchaser incentive program on a network-wide level. The system associates SKU and UPC data on a network level to provide consumers with a purchasing environment that is both convenient and cost-efficient. The association of SKU and UPC data at a network level also provides consumers with the ability to analyze their own purchase data for a variety of purposes, including analyses relating to the consumer's spending behaviors or patterns for example. In accordance with one aspect of the invention, the association of UPC and SKU data by the system facilitates a search which may be network-wide for an item that a consumer desires to purchase under terms or conditions that are selected by the consumer and are therefore perceived to be optimal by that consumer. In accordance with another aspect of the invention, the association of UPC and SKU data by the system facilitates data analysis by a consumer based upon any of several factors, including items purchased, prices for those items, retailer ID, SKU number, UPC, manufacturer ID, and/or the like. The system may compile any of the above data across multiple entities for the purpose of data analysis, such as analyses which may be employed in consumer budgeting for example.

BRIEF DESCRIPTION OF EXEMPLARY DRAWINGS

Additional aspects of the present invention will become evident upon reviewing the non-limiting embodiments described in the specification and the claims, in conjunction with the accompanying figures, wherein like numerals designate like elements, and wherein:

DETAILED DESCRIPTION OF EXEMPLARY EMBODIMENTS

Figure 1:
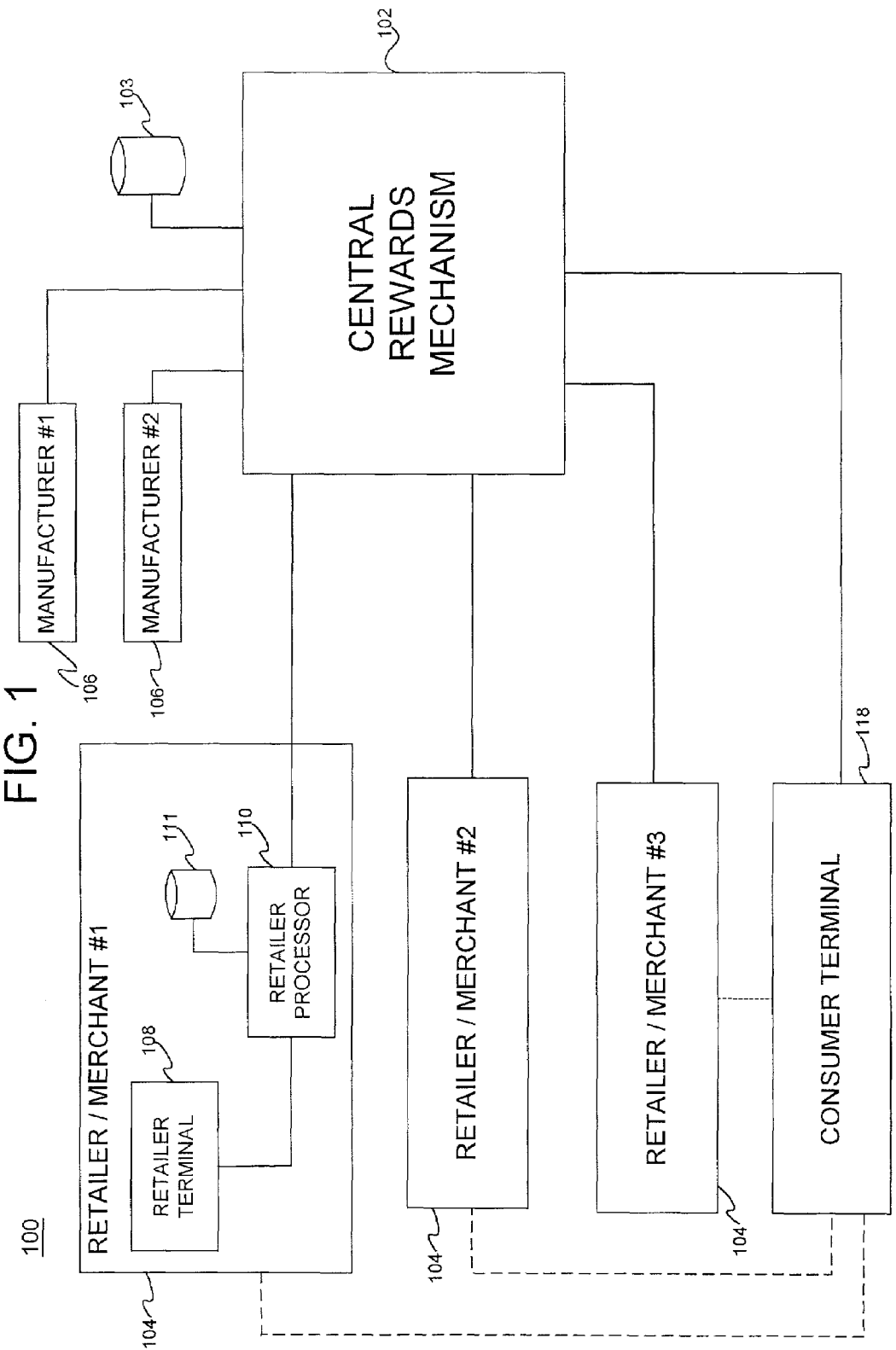
FIGS. 1-3 are schematic block diagrams illustrating exemplary incentive systems in accordance with various aspects of the present invention.

The following disclosure presents and describes various exemplary embodiments in sufficient detail to enable those skilled in the art to practice the invention, and it should be understood that other embodiments may be realized without departing from the spirit and scope of the invention. Thus, the following detailed description is presented for purposes of illustration only, and not of limitation, and the scope of the invention is defined solely by the appended claims.

The present invention may be described herein in terms of functional block components and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, or the like, with the various algorithms being implemented with any combination of data structures, objects, processes, routines, or other programming elements. Further, it should be noted that the present invention may employ any number of conventional techniques for data transmission, signaling, data processing, network control, and the like. For a basic introduction to cryptography, please review a text written by Bruce Schneider which is entitled "Applied Cryptography: Protocols, Algorithms, And Source Code In C," published by John Wiley & Sons (second edition, 1996), which is hereby incorporated by reference.

It should be appreciated that the particular implementations shown and described herein are illustrative of the invention and its best mode and are not intended to otherwise limit the scope of the present invention in any way. Furthermore, the connecting lines shown in the various figures contained herein are intended to represent exemplary functional relationships and/or physical couplings between the various elements. It should be noted that many alternative or additional functional relationships or physical connections may be present in a practical incentive system implemented in accordance with the invention.

Communication between participants in the system of the present invention is accomplished through any suitable communication means, such as, for example, a telephone network, public switch telephone network, intranet, Internet, extranet, WAN, LAN, point of interaction device (e.g., point of sale device, personal digital assistant, cellular phone, kiosk terminal, automated teller machine (ATM), etc.), online communications, off-line communications, wireless communications, satellite communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

It further will be appreciated that users may interact with the system via any input device such as a keyboard, mouse, kiosk, personal digital assistant, handheld computer (e.g., Palm Pilot®), cellular phone, and/or the like. Similarly, the invention could be used in conjunction with any type of personal computer, network computer, workstation, minicomputer, mainframe, or the like, running any operating system, such as any version of Windows, Windows NT, Windows 2000, Windows 98, Windows 95, MacOS, OS/2, BeOS, Linux, UNIX, or the like. Moreover, although the invention may be described herein as being implemented with TCP/IP communications protocols, it will be readily understood that the invention could also be implemented using IPX, Appletalk, IP-6, NetBIOS, OSI, or any number of existing or future protocols. Moreover, the system contemplates the use, sale, or distribution of any goods, services, or information over any network having similar functionality described herein.

Each participant or user of the system of the present invention, including purchasers, retailers, manufacturers, and a third-party providers, may be equipped with a suitable computing system to facilitate online communications and transactions with any other participant. For example, some or all participants may have access to a computing unit in the form of a personal computer, although other types of computing units may be used, including laptops, notebooks, handheld computers, set-top boxes, kiosk terminals, and the like. Additionally, other participants may have computing systems which may be implemented in the form of a computer-server, a PC server, a networked set of computers, or any other suitable implementations which are known in the art or may hereafter be devised.

The computing systems may be connected with each other via a data communications network, as described more fully above. For example, the network may be a public network, which is assumed to be insecure and open to eavesdroppers. In one embodiment, the network is embodied as the Internet. In this context, the computers may or may not be connected to the Internet at all times. For instance, the consumer's computer may employ a modem to occasionally connect to the Internet, whereas the retailer computing system, the manufacturer computing system, and the central rewards mechanism might maintain a permanent connection to the Internet. It is noted that the network may be implemented as other types of networks, such as an interactive television (ITV) network.

The retailer's computer system may also be interconnected to a third-party provider via a second network, referred to as a payment network. The payment network represents existing proprietary networks that presently accommodate transactions for credit cards, debit cards, and other types of financial instruments or banking cards. The payment network is a closed network that is assumed to be secure from eavesdroppers. Examples of the payment network include the American Express®, VisaNet®, and the Veriphone® networks.

As will be appreciated by one of ordinary skill in the art, the present invention may be embodied as a method, a data processing system, a device for data processing, and/or a computer program product. Accordingly, aspects of the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described below with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process, such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose, hardware-based computer systems which perform the specified functions or steps, or suitable combinations of special purpose hardware and computer instructions.

As used herein, the terms "user" and "participant" shall interchangeably refer to any person, entity, charitable organization, machine, hardware, software, or business who accesses and uses the system of the invention, including consumers, retailers, manufacturers, and third-party providers. Participants in the system may interact with one another either online or off-line.

As used herein, the term "online" refers to interactive communications that take place between participants who are remotely located from one another, including communication through any of the networks or communications means described above or the like.

The term "manufacturer" shall include any person, entity, charitable organization, machine, software, hardware, and/or the like that manufactures, distributes, or originates a product or service which may ultimately be offered to a consumer directly or indirectly through a retailer. The term "manufacturer" may also include any party that generates and/or provides manufacturer item identifiers.

The term "retailer" shall include any person, entity, charitable organization, machine, software, hardware, and/or the like that that offers a product or service to a consumer. As used herein, the term "retailer" is used interchangeably with the term "merchant". Moreover, in this context, a retailer or merchant may offer or sell, either online or off-line, products and/or services made or supplied by at least one manufacturer.

As used herein, the phrases "network level" and "network-wide level" shall refer to a system that includes more than one retailer and at least one manufacturer.

As used herein, the terms "purchaser", "customer", "consumer", and "end-user" may be used interchangeably with each other, and each shall mean any person, entity, charitable organization, or business which uses a consumer ID to participate in the present system.

A "consumer ID", as used herein, includes any device, code, or other identifier suitably configured to allow the consumer to interact or communicate with the system, such as, for example, a rewards card, charge card, credit card, debit card, prepaid card, telephone card, smart card, magnetic stripe card, bar code card, transponder, authorization/access code, personal identification number (PIN), Internet code, other identification code, and/or the like. Additionally, a "consumer ID" may comprise any form of radio wave, electronic, magnetic, and/or optical device capable of receiving (uploading) and/or transmitting (downloading) data to and/or from itself to a second device which is capable of interacting and communicating with such forms of consumer ID.

"Consumer enrollment data" may comprise any of the following: name; address; date of birth; social security number; email address; gender; the names of any household members; survey data; interests; educational level; and/or any preferred brand names. A consumer may register to participate in the present system by any methods known and practiced in the art. For example, a consumer may be enrolled automatically (e.g., if the consumer holds an existing consumer account with the system administrator), over the phone, at the point of sale (e.g., through a paper application or a verbal interview), through the mail, or through instant enrollment online. Upon enrollment, the consumer receives a consumer ID that is associated with a consumer account.

In an exemplary aspect, "consumer enrollment data" may also comprise a transaction card number for charging any fees that may be associated with participation in the system and/or for facilitating the purchase of goods and services through the virtual purchasing system described below. In this context, a "transaction card number" may include any device, code, or suitable financial instrument representing an account with a financial institution, such as a bank, a card issuer, and/or the like, wherein the device, code, or other suitable financial instrument has a credit line or balance associated with it, and wherein the credit line or balance is in a form of financial tender having discrete units, such as currency. Moreover, a "transaction card number", a "transaction card", or a "card", as used herein, includes any device, code, or financial instrument suitably configured to allow the cardholder to interact or communicate with the system, such as, for example, a charge card, credit card, debit card, prepaid card, telephone card, smart card, magnetic stripe card, bar code card, authorization/access code, personal identification number (PIN), Internet code, other identification code, and/or the like.

A "consumer profile", as used herein, shall refer to any data used to characterize a consumer and/or the behavior of a consumer. In the context of a commercial transaction, "a consumer profile" shall be understood to include, for example, the time and date of a particular purchase, the frequency of purchases, the volume/quantity of purchases, the transaction size (price), and/or the like. Additionally, in other transactional contexts, the term "consumer profile" shall also be understood to include non-purchase behaviors of a consumer, such as consumer enrollment data, visiting a Web site, referrals of prospective participants in the system, completion of a survey or other information gathering instrument, and/or the like. For instance, a participating online consumer may earn rewards points automatically through a triggering event, such as visiting a Web site, completing an online survey, or clicking on a banner advertisement for example. Off-line, a participating consumer may earn rewards points by completing a task or showing their consumer ID to the cashier and triggering the cashier to provide a "behavior" ID which may be input (e.g., by scanning a bar code on a paper survey for example) into the POS terminal. Further, any aspects of the consumer profile may be used in the context of data analysis.

A "third-party provider" may comprise any additional provider of goods and/or services to a consumer. Specifically, a "third-party provider" includes any party other than the particular manufacturer and retailer who is involved in a transaction with a consumer. A third-party provider may include, for example, a financial institution, such as a bank or an issuer of a financial instrument (such as a credit card or a debit card). A third-party provider may also include a provider of goods and services which are offered as awards to consumers in exchange for a requisite number of reward points.

Though the invention may generically be described with reference to a series of transactions which transfer a good or service from an originating party to an intermediary party and a subsequent transaction which transfers the good or service from the intermediary party to an end-user of that good or service, for convenience and purposes of brevity and consistency, the present disclosure generally refers to the originating party as a "manufacturer", the intermediary party as a "retailer", the end-user as a "consumer", and a good or service as a "product" or "item". However, it will be recognized by those of ordinary skill in the art that the retailer need not provide a product or item to a consumer in exchange for monetary currency. While this often may be the case, the present disclosure is not so limited and includes transactions which may be gratuitous in nature, whereby the retailer transfers a product or item to a consumer without the consumer providing any currency or other value in exchange. It is further noted that additional participants, referred to as third-party providers, may be involved in some phases of the transaction, though these participants are not shown. Exemplary third-party providers may include financial institutions, such as banks, credit card companies, card sponsoring companies, or issuers of credit who may be under contract with financial institutions. It will be appreciated that any number of consumers, retailers, manufacturers, third-party providers, and the like may participate in the system of the present invention.

As used herein, the term "UPC" and the phrase "manufacturer item identifier" shall refer to any symbol or indicia which provides information and, in an exemplary embodiment, shall refer to any number, code, or identifier assigned by a manufacturer and associated with an item, including any type of goods and/or services, ultimately offered to a consumer or other end-user. Colloquially, a UPC is sometimes referred to as a SKU number. However, as used herein, the term "SKU" and the phrase "retailer item identifier" shall refer to any symbol or indicia which provides additional information and, in an exemplary embodiment, shall refer to any number, code, or identifier assigned by a retailer and associated with an item, including any type of goods and/or services, offered to a consumer or other end-user.

"Purchase data", as used herein, comprises data relating to the offer of any item to a consumer or other end-user. Purchase data may include any of the following: an item purchased, an item price, a number of items purchased, a total transaction price, a payment vehicle, a date, a retailer ID, a store ID, an employee identifier, a retailer item identifier, a manufacturer ID, a manufacturer item identifier, a loyalty identifier, and/or the like.

"Retailer ID" or "retailer identifier", as used herein, comprises any symbol, indicia, code, number, or other identifier that may be associated with a retailer of any type of goods and/or services offered to a consumer or other end-user. A retailer ID may also include or be associated with a "store ID", which designates the location of a particular store.

A "manufacturer ID" or "manufacturer identifier" comprises any symbol, indicia, code, number, or other identifier that may be associated with a manufacturer of any type of goods and/or services ultimately offered to a consumer or other end-user.

An "award" or "reward" may comprise any quantity of products, services, coupons, gift certificates, rebates, reward points, bonus points, credits or debits to a financial instrument, any combination of these, and/or the like.

"Data analysis", as used herein, shall be understood to comprise quantitative and qualitative research, statistical modeling, regression analyses, market segmentation analyses, econometrics, financial analyses, budgeting analyses, and/or the like. Such analyses may be used to predict consumer behaviors and/or correlate consumer profiles, retailer data, manufacturer data, and/or product or service data. Such analyses may also be used to monitor a consumer's personal finances by enabling a consumer to track their spending behaviors and patterns, as an individual or as part of a family, organization or other group.

The system of the present invention associates or maps manufacturer UPC data and retailer SKU data on a network level to reward consumers and/or to analyze the data for a variety of business purposes, such as market segmentation analyses and/or analyses relating to consumer spending behaviors or patterns for example. Rather than simply capturing transactions at a Record of Charge (ROC) level, that is, recording consumer purchases in a general fashion by designating purchase categories (such as "clothing", "electronics", or "hardware" for example), the system identifies the particular item purchased (such as "jeans", "stereo", or "hammer" for example) as well as its corresponding manufacturer. By matching or associating the retailer SKU and the manufacturer's UPC, the system permits the standardization of goods and/or services codes at the network level. This standardization not only permits a record of both the specific item purchased and its manufacturer, regardless of the particular retailer involved in the transaction, but it permits the mapping of multiple consumers, multiple goods and/or services, multiple retailers, and/or multiple manufacturers to advantageously cross-market goods and services to consumers.

In accordance with one aspect of the invention, the association of UPC and SKU data by the system facilitates implementation of an incentive or loyalty program by providing a universal rewards currency which may be "spent" by participants who have earned rewards and accepted by the other participants in the multi-tiered network created by the system. The network may comprise any number of participants, including consumers, retailers (and any of their employees), manufacturers, third-party providers, and the like. Each of these categories of participants may be considered a tier in the network, and each participant within the various tiers may design and implement an independent rewards scheme within the context of the universal environment provided by the system. For example, Manufacturer 1 may produce and assign a UPC to Item X. Item X may subsequently be offered for sale by both Retailer 1 and Retailer 2. Retailer 1 and Retailer 2 may then each assign an independent SKU number to Item X to facilitate their own tracking, inventory, and pricing schemes. A consumer may then purchase Item X from both Retailer 1 and Retailer 2.

Since the system is capable of processing, associating, and quantifying a variety of data, including consumer data, employee data, retailer data, manufacturer data, SKU number data corresponding to Item X, and UPC data assigned by Manufacturer 1, for example, this data can then be used by the manufacturer, the retailer, the system administrator, and/or a third-party provider to provide rewards to consumers, employees, retailers, etc. For example, a manufacturer may provide frequency-based incentives, such as every $10^{th}$ purchase of a particular item will be discounted by 50% for example, independent of and/or in addition to any incentives offered by the specific retailer involved in the transaction. Additionally, the manufacturer may provide sales incentives to the employees of retailers independent of and/or in addition to any employee incentive programs that the retailers may choose to implement.

Since rewards, which may be in the form of rewards points, may be earned across the various tiers in the network, rewards may also be used or spent across the various tiers in the network. Thus, any rewards points that an employee, for example, may earn by promoting a particular manufacturer's line of products, may be "spent" by that employee on goods or services provided by any participant in the network, not merely at the retailer who employs that employee. Likewise, any rewards points earned by a consumer may be spent on goods or services offered by any participant in the network.

In accordance with another aspect of the invention, the association of UPC and SKU data by the system facilitates data analysis on a network level based upon several factors, including any of the following: consumer ID, consumer profile, retailer ID, SKU number, UPC, manufacturer ID, and/or the like. The system may compile any of the above data across multiple participants for the purpose of data analysis, such as analyses which may be employed in strategic planning and marketing for example. The system of the invention may be used to compile, analyze, and report data in a manner which would inform any or all network participants that, for example, a specific consumer (1) has made multiple purchases of particular manufacturers' products; (2) has spent Q dollars over a certain time period; (3) at specific multiple retailers; and (4) of the purchases made, R dollars went towards the purchase of Product 1, S dollars went towards the purchase of Product 2, and T dollars went towards the purchase of Service 1. Moreover, the system may be used to compile, analyze, and report data that enable a retailer, a manufacturer, and/or a third-party provider to create a variety of targeted marketing promotions, such as, for example, (1) marketing Product 1 offered by Manufacturer 1 to consumers who purchase Product 2 offered by Manufacturer 2; (2) marketing Product 1 offered by Manufacturer 1 and sold by Retailer X to consumers who purchase Product 2 offered by Manufacturer 2 at Retailer Y; and/or (3) marketing Product 1 offered by Manufacturer 1 and sold by Retailer X to consumers who purchase Product 2 offered by Manufacturer 2 at Retailer Y five times a year. It will be appreciated that these are but a few of the many possible applications for data gathered and generated by the system of the present invention.

In accordance with a further aspect of the invention, the system administrator may allocate rewards points to participants in the system. In one embodiment, participating retailers and/or manufacturers may purchase points from the system administrator and the points are then allocated to an account associated with the retailer and/or manufacturer. In an alternate embodiment, the system administrator may give or donate points to participating retailers and/or manufacturers. The system administrator maintains an account with each of the participating retailers and manufacturers and tracks available points balances and/or balances owing on a rolling basis. The points purchased by the retailers and/or manufacturers may then be earned by and issued to consumers in a manner that is predetermined by the retailer and/or manufacturer involved in the transaction with the consumer. For example, Retailer 1 may purchase 10,000 points from the system administrator and then offer consumers 1 point for every $10 dollars spent in Retailer 1's store or, perhaps, some number of points for every fifth transaction in the store. Moreover, Manufacturer 1, who produces the product offered by Retailer 1, may also purchase points from the system administrator. Thus, when a consumer purchases Manufacturer 1's product at Retailer 1, Manufacturer 1 may issue some number of points to the consumer. The issuance of points, either by retailers or manufacturers, may be based upon any selected criteria, including a points-for-dollars ratio, a defined quantity of points per item or per transaction, some combination of these, and/or the like.

The system administrator maintains an account for each participating consumer and apprises the consumer of the points totals and account activity. The consumer may review the total number of points in the account either online or off-line, such as through a periodic statement sent by the system administrator or through the use of a communications network, such as the Internet, for example. Points in the consumer's account are accumulated across the multiple retailers and/or manufacturers participating in the system. Thus, points earned by a consumer based upon transactions with different retailers and/or manufacturers are combined, resulting in a rapid accrual of points. The system administrator offers a catalog of products and services, which may be either online or off-line, from which consumers may select rewards in exchange for accrued points. In this manner, consumers advantageously earn points based upon their everyday purchases of products and services, these points are accrued across retailers and/or manufacturers, and points redemption takes place through a single, universal catalog of rewards.

In accordance with the present invention, FIG. 1 is a diagram illustrating an exemplary embodiment of an incentive or loyalty system 100. System 100 comprises a central rewards mechanism 102; a plurality of retailer/merchant systems 104; and at least one manufacturer 106. One skilled in the art will appreciate that system 100 may comprise any number of retailer systems 104 and any number of manufacturers 106.

The central rewards mechanism 102 manages the incentive or loyalty program of the system 100. In an exemplary embodiment, central rewards mechanism 102 receives, processes, and stores manufacturer data, such as information regarding products and/or services and UPC data, transmitted by manufacturers 106 who have enrolled in the system 100. Manufacturers 106 may transmit data to central rewards mechanism 102 in any form and by any means known in the art, including any of the communications means described above. The manufacturer data is stored by the central rewards mechanism 102 in database 103. Database 103 may be any type of database, such as relational, hierarchical, object-oriented, and/or the like. Common database products that may be used to implement database 103 include DB2 by IBM (White Plains, N.Y.), any of the database products available from Oracle Corporation (Redwood Shores, Calif.), Microsoft Access by Microsoft Corporation (Redmond, Wash.), or any other database product. Database 103 may be organized in any suitable manner, including as data tables or lookup tables.

The central rewards mechanism 102 may receive and process consumer ID information and purchase data from any of the retailer systems 104. The central rewards mechanism 102 may also associate a particular consumer ID with the purchase data and a corresponding manufacturer item identifier. In one embodiment, the central rewards mechanism 102 performs an analysis involving any of the following: a consumer ID, purchase data, a points ratio, a consumer profile, a retailer ID, and a manufacturer ID. The analysis may be dependent upon an the association of the consumer IDs, the purchase data, and the manufacturer item identifier. The analysis may further comprise, for example, a calculation of rewards points and/or other analyses for purposes of market segmentation, determining consumer spending behavior, correlating spending behavior and consumer demographics, and/or the like, as described in greater detail above.

In one exemplary embodiment, the central rewards mechanism 102 stores and informs a consumer of the rewards points that have been earned by a particular transaction as well as accumulated over time. The number of rewards points calculated and awarded by the central rewards mechanism 102 for a particular purchase may depend upon a predetermined rewards ratio. The rewards ratio may be determined by the retailer, the system administrator, the manufacturer of the purchased item, and/or any other suitable third-party. For example, if a participating consumer buys a product from a retailer for $100 and if the retailer rewards ratio is one reward point for each dollar of the purchase price (i.e., one-for-one), once the consumer's consumer ID is identified by the system, the consumer is credited with a suitable number of rewards points from the retailer, which, in this case, would be 100 points. However, if the manufacturer also chooses to issue rewards points for the item purchased, the manufacturer may select a points ratio that is different from the retailer's selected ratio. In the illustrated example, if the manufacturer's selected points ratio is two-for-one, then the consumer will be awarded an additional 200 points from the manufacturer for this single $100 purchase. In this manner, the system of the invention may provide "earn accelerators" through which consumers may accumulate rewards points at a comparatively rapid rate. In other words, a single purchase may generate rewards points for a consumer from any or all of a retailer, a manufacturer, and/or a third-party provider, and those rewards points may be used as rewards currency by the consumer throughout the network established by the system of the invention.

In an exemplary embodiment, retailer system 104 comprises a retailer terminal 108 and a retailer processor 110 in communication with database 111. Retailer terminal 108 comprises any device capable of identifying a consumer ID. Exemplary devices for identifying a consumer ID may include: a conventional card reader which recognizes a magnetic stripe or bar code associated with a consumer ID; a biometric device; a smart card reader which recognizes information stored on a microchip integrated with a consumer ID; and any device capable of receiving or uploading consumer ID data transmitted electronically, magnetically, or optically; and/or the like. In one embodiment, retailer terminal 108 and retailer processor 110 are co-located at a retail store. In another embodiment, retail terminal 108 and retailer processor 110 are remote from each other.

Figure 2:
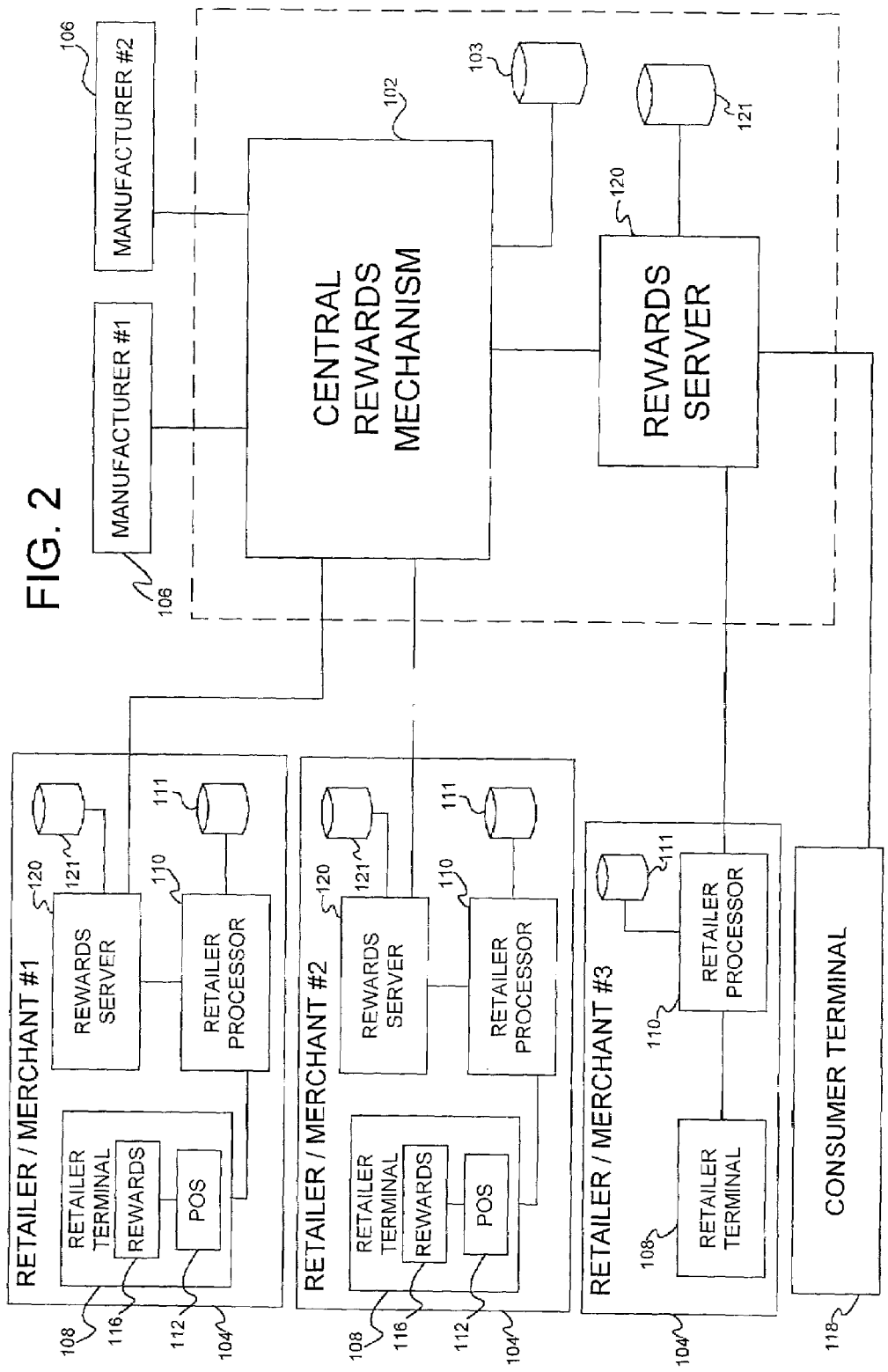

In an exemplary embodiment, as illustrated in FIG. 2, retailer terminal 108 comprises a retailer POS terminal 112, such as a cash register or an online retailer Web site, for example. When a consumer ID is used at the time an item is purchased, purchase data, including a SKU number, is input, sensed, or otherwise recognized by terminal 108, and then the purchase data is processed and stored by retailer processor 110. Retailer processor 110 comprises or is in communication with a suitable database 111 or other storage device for maintaining and storing purchase data and any other suitable retailer information. Database 111 may be any type of database, such as any of the database products described above for example. Database 111 may be organized in any suitable manner, including as data tables or lookup tables. Purchase data that is stored in database 111 is available to the retailer's local back office system (not shown) for inventory, accounting, tax, data analysis, and other purposes. The captured purchase data may include the item purchased, the item's unit price, the number of items purchased, the date, the store location, an employee ID, and any other information related to the purchase. In an exemplary embodiment, retailer processor 110 may also receive, process, and store manufacturer data, such as information regarding products and/or services and UPC data, from manufacturers 106 who have enrolled in the system 100. The manufacturer data may be stored in any suitable form, including data tables or lookup tables.

Figure 3:
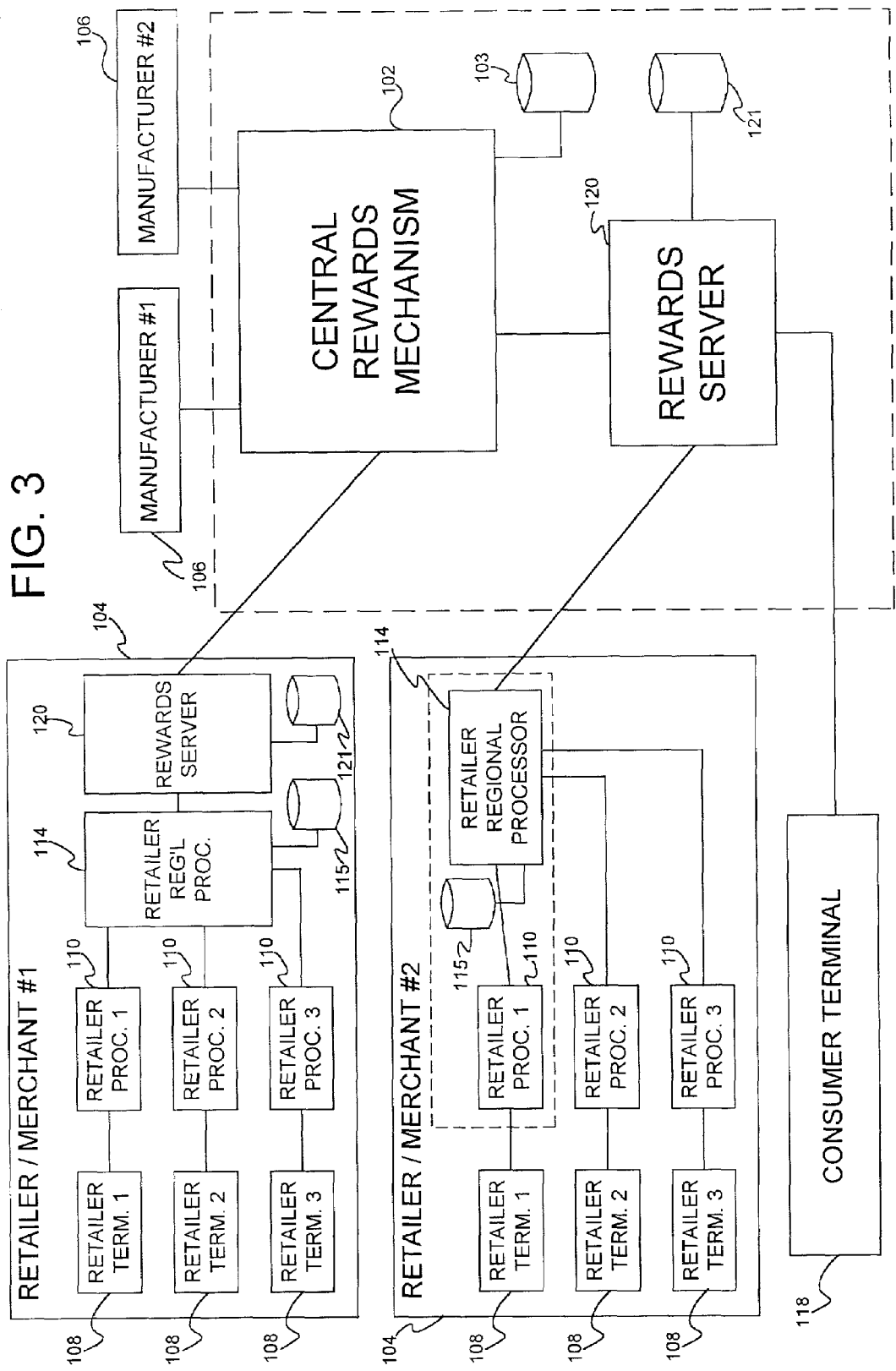

In accordance with the exemplary embodiments illustrated in FIG. 3, purchase data may also be transmitted to, and then processed and stored by, a retailer regional processor 114 (or, alternatively, a retailer national processor (not shown)) in communication with database 115 for the purpose of further back office and cumulative data analysis. Database 115 may be any type of database, such as any of the database products described in greater detail above for example. Database 115 may be organized in any suitable manner, including as data tables or lookup tables. In an exemplary embodiment, retailer processor 110 optionally may be integrated with retailer regional processor 114 (illustrated by the phantom lines encompassing Retailer Processor 1 and retailer regional processor 114 within the system of Retailer/Merchant #2), thereby forming a single device. In another embodiment, retailer processor 110 and retailer regional processor 114 are separate devices which may be either co-located with each other or remotely located from one another. For example, in one embodiment, retailer processor 110 and regional processor 114 are co-located at a particular retail store. In another embodiment, retailer processor 110 is located at a particular retail store and retailer regional processor 114 is remotely located at a regional office.

Regardless of the location of retailer regional processor 114, retailer regional processor 114 receives and processes similar information from each of the retailer processors 110 associated with each of the retail stores owned by the same retailer. Whether the system 100 comprises a retailer regional processor 114 or a retailer national processor may be a function of the number of stores maintained by a particular retailer. That is, a larger retailer who has numerous stores throughout the country, for example, may choose to have a plurality of regional processors, while a smaller retailer with a few stores scattered across the country may be better served by a single, national processor. In exemplary embodiments, the retailer regional processors 114 and/or national processors communicate with a suitable database 115 or other storage device which is configured to store and maintain purchase data and any other suitable retailer information. In another exemplary embodiment, retailer regional processor 114 may receive, process, and store manufacturer data, such as information regarding products and/or services and UPC data, from manufacturers 106 who have enrolled in the system 100. The manufacturer data may be stored in any suitable form, including data tables or lookup tables.

With momentary reference to FIG. 2, retailer terminal 108 may comprise a rewards terminal 116 through which a consumer may be updated with regard to various aspects of the system. For example, rewards terminal 116 may inform a consumer of the number of reward points that they have accumulated from all system participants and the types of awards that may be obtained using those reward points. Moreover, rewards terminal 116 may suggest to the consumer various awards for which the consumer is eligible based upon the rewards points generated by the consumer's network-wide purchases. In this context, network-wide purchases include any purchases of items corresponding to retailers and/or manufacturers participating in the system 100.

In an exemplary embodiment, rewards terminal 116 operates in real-time. In this context, "real-time" means that reward points are immediately, or nearly immediately, updated at the time purchases are made and are therefore immediately redeemable by the consumer at the a point of sale. Thus, for example, a consumer may be informed by rewards terminal 116 at the point of sale that the item being purchased by the consumer may be purchased using the consumer's accumulated reward points, including points accumulated on a network level. Points accumulated on a network level enable consumers to accumulate points more rapidly than would be possible if only a single retailer or group of retailers were issuing the points. In one embodiment, rewards terminal 116 may update a consumer's rewards points in real-time and, in response to the consumer's particular points total, issue a coupon, a gift certificate, and/or additional bonus points to the consumer.

In another exemplary embodiment, the system may operate in batch mode, wherein points totals are calculated, stored, and periodically updated for access by the retailer terminal 108, including POS terminal 112 and/or rewards terminal 116. Thus, in this embodiment, the consumer may be notified of available points sometime after a purchase, or a suggestive sale may take place after a purchase. The total point count or suggestive sale may take into account points generated and accumulated as the result of network-wide purchases.

In various alternate embodiments of the invention, retailer terminal 108 may include a rewards terminal 116 but not a POS terminal 112; a POS terminal 112 but not a rewards terminal 116; or a POS terminal 112 in communication with a rewards terminal 116. In alternate embodiments, where terminal 108 includes a POS terminal 112 and a rewards terminal 116, the two terminals 112 and 116 may be variously implemented as separate terminals, integrated terminals, or software within a device. In another embodiment, where terminal 108 comprises a rewards terminal 116 but not a POS terminal 112, terminal 108 may be a kiosk terminal located within a retail store or some other remote terminal which is capable of recognizing a consumer ID and communicating with the system 100. A consumer may use independent rewards terminal 116 to do, for example, any of the following: view accumulated reward points totals; view potential awards which the consumer may obtain in exchange for various numbers of points; select an award; redeem rewards points for a selected award; request and/or receive a reward points advisory statement; and/or view a directory of participating retailers, manufacturers, and third-party providers.

In another exemplary embodiment, system 100 further comprises a consumer terminal 118. Consumer terminal 118 is any remote terminal through which a consumer may access other aspects of the system 100. Consumer terminal 118 may comprise any of the input devices, computing units, or computing systems described above. Further, consumer terminal 118 communicates with the system 100 through any of the communications networks described above. In one embodiment, consumer terminal 118 permits a consumer to engage multiple facets of the system 100 in an interactive online communications environment. The interactive online environment made available through consumer terminal 118 is an extension of the network-level incentive award program and is implemented in conjunction with other aspects of the system 100. In this context, a consumer may use consumer terminal 118 for a variety of purposes. In one embodiment, consumer terminal 118 may be used to communicate with and receive information from the central rewards mechanism 102. For example, a consumer may use consumer terminal 118 to do any of the following: enroll in the system; receive statements or reports regarding accumulated reward points totals; receive bonus details; view potential awards which the consumer may obtain in exchange for various numbers of points; select an award; receive redemption information; view points adjustments; redeem rewards points for a selected award; request and/or receive a reward points advisory statement; receive information regarding where and how points were earned and/or how points were redeemed; receive information regarding expiration dates for points earned; receive information relating to any applicable fees; receive information regarding marketing promotions; and/or view a directory of participating retailers, manufacturers, and/or third-party providers.

In another embodiment, consumer terminal 118 may be used to interact with and/or make purchases and generate rewards points from participating online retailers, as illustrated by the various phantom lines in FIG. 1. The online retailer may then communicate with the central rewards mechanism 102 to transmit and process a consumer ID, purchase data, etc., as described above with reference to retailer 104 of FIG. 1. Information communicated between the online consumer, the online retailer, and the online central rewards mechanism may include, for example, product or service information, prices, availability of the product or service, shipping information, rewards points information, available awards, information regarding points ratios and points redemption, and/or the like. In one embodiment, consumer terminal 118 operates in real-time, as described above with respect to rewards terminal 116. In another embodiment, the consumer terminal 118 may operate in batch mode, as described above. In still a further embodiment, consumer terminal 118 operates in a manner which includes aspects of both real-time functionality and batch mode functionality.

In accordance with a further aspect of the invention, the system 100 may comprise a rewards server 120 in communication with a database 121, as illustrated in FIG. 2. Database 121 may be any type of database, such as any of the database products described above for example. Database 121 may be organized in any suitable manner, including as data tables or lookup tables. In an exemplary embodiment, rewards server 120 may be any hardware and/or software that is configured to communicate with the central rewards mechanism 102 and either the retailer processor 110 or the retailer regional processor 114. In alternate exemplary embodiments, rewards server 120 may be integrated with retailer system 104; rewards server 120 may be integrated with central rewards mechanism 102; or rewards server 120 may be separate from both retailer system 104 and central rewards mechanism 102. In a further embodiment, the rewards server 120 may communicate with both a retailer national processor (not shown) and the central rewards mechanism 102.

In an exemplary embodiment, rewards server 120 receives, processes, and stores both manufacturer data and retailer data. Manufacturer data may include descriptions of products and/or services and UPC data transmitted from manufacturers 106 who have enrolled in the system 100. The manufacturer data may be stored in any suitable form, including data tables or lookup tables. Retailer data may include descriptions of products and/or services and SKU data transmitted from retailers 104 who have enrolled in the system 100. The retailer data may be stored in any suitable form, including data tables or lookup tables.

In an exemplary embodiment, the rewards server 120 performs a plurality of functions that might otherwise be performed by the central rewards mechanism 102. For example, since rewards calculations require significant processing and memory resources, performance of calculations processing by the rewards server 120 at the regional level lessens the processing load on the central rewards mechanism 102, thereby increasing the efficiency of the central rewards mechanism 102. In an exemplary embodiment, each retailer's region, which comprises a plurality of that retailer's stores or outlets, accesses a rewards server 120 which acts as an intermediary between the retailer regional processor 114 and the central rewards mechanism 102. This configuration relieves the processing, power, memory, and other requirements of the central rewards mechanism 102. Moreover, each retailer is but one of many retailers that may participate in the network level rewards structure. Accordingly, a plurality of rewards servers 120 may be in communication with the central rewards mechanism 102 as well as each of the participating retailer regional processors 114, further alleviating the processing burden and freeing up the resources of the central rewards mechanism 102.

Implementations which include at least one independent rewards server 120 are also advantageous because cost-effective communications links may be used to facilitate communications with the central rewards mechanism 102. Performance by the rewards server 120 of many of the "intelligence functions" of the system 100, permits transmission of only particular forms of purchaser information to the central rewards mechanism 102. In an exemplary embodiment, data sent from the rewards server 120 to the central rewards mechanism 102 may include the consumer ID and the total number of rewards points earned by a consumer in a particular transaction. In another exemplary embodiment, data transmitted by the rewards server 120 to the central rewards mechanism 102 may also include any pre-selected aspect of the consumer profile, any pre-selected aspect of the purchase data, and/or any other pre-selected data associated with a consumer, a retailer, a manufacturer, and/or a third-party provider. Pre-selection of the types of data transmitted by the rewards server 120 to the central rewards mechanism 102 may be conducted by the system administrator, a retailer, a manufacturer, and/or a third-party provider. Thus, data which may be useful for purposes of data analysis but unrelated to the rewards feature, such as the characteristics of the particular item purchased for example, may not need to be transmitted to the central rewards mechanism 102.

Exemplary functions performed by the rewards server 120 may include the association of UPC and SKU data; manipulation of the rewards criteria applicable in particular cases, which may further depend upon the retailer, manufacturer, and/or third-party provider involved in a specific transaction with a consumer; calculation of rewards benefits earned by the consumer; filtration functions for determining which data is transmitted from the rewards server 120 to the central rewards mechanism 102; and/or various types of data analyses, as described above. In an exemplary embodiment, the retailer system 104 houses, maintains, and updates the hardware and/or software of the rewards server 120. In another embodiment, rewards server 120 may be housed, maintained, and updated by the system administrator.

In accordance with another embodiment of the present invention, the system 100 permits an open payment system. Since the invention generally provides that consumer participation in the system is based upon a consumer ID, a purchaser may use any of multiple payment vehicles (such as cash, check, charge card, credit card, debit card, MasterCard®, Visa®, and/or the American Express® Card for example) to make purchases at the various retailers and still participate in the system. Thus, in one embodiment, the consumer ID is independent of any particular payment vehicle, such as a credit card for example.

However, alternate embodiments of the invention may be implemented which associate a consumer ID with a particular payment vehicle, such as a consumer's credit card account, charge card account, debit card account, and/or bank account for example. In this embodiment, the retailer conducting the transaction need only participate in the system to the extent that the retailer provides its SKU data to the system 100, such as to the rewards server 120. In other words, when a consumer ID is associated with an instrument (e.g., a credit card) from a third-party provider, the retailer need not provide a rewards terminal or other terminal capable of processing the consumer ID, since the third-party provider may process the consumer ID as part of the payment transaction. Thus, in this embodiment, rewards benefits may be earned by the consumer on a network-wide level without the retailer's direct participation in the rewards feature (notwithstanding the retailer's participation in transmitting SKU data to the system). Moreover, it will be appreciated that a single consumer ID may be associated with multiple third-party payment vehicles, thereby allowing a consumer to generate rewards points regardless of the particular payment vehicle selected for a particular purchase.

Figure 4:
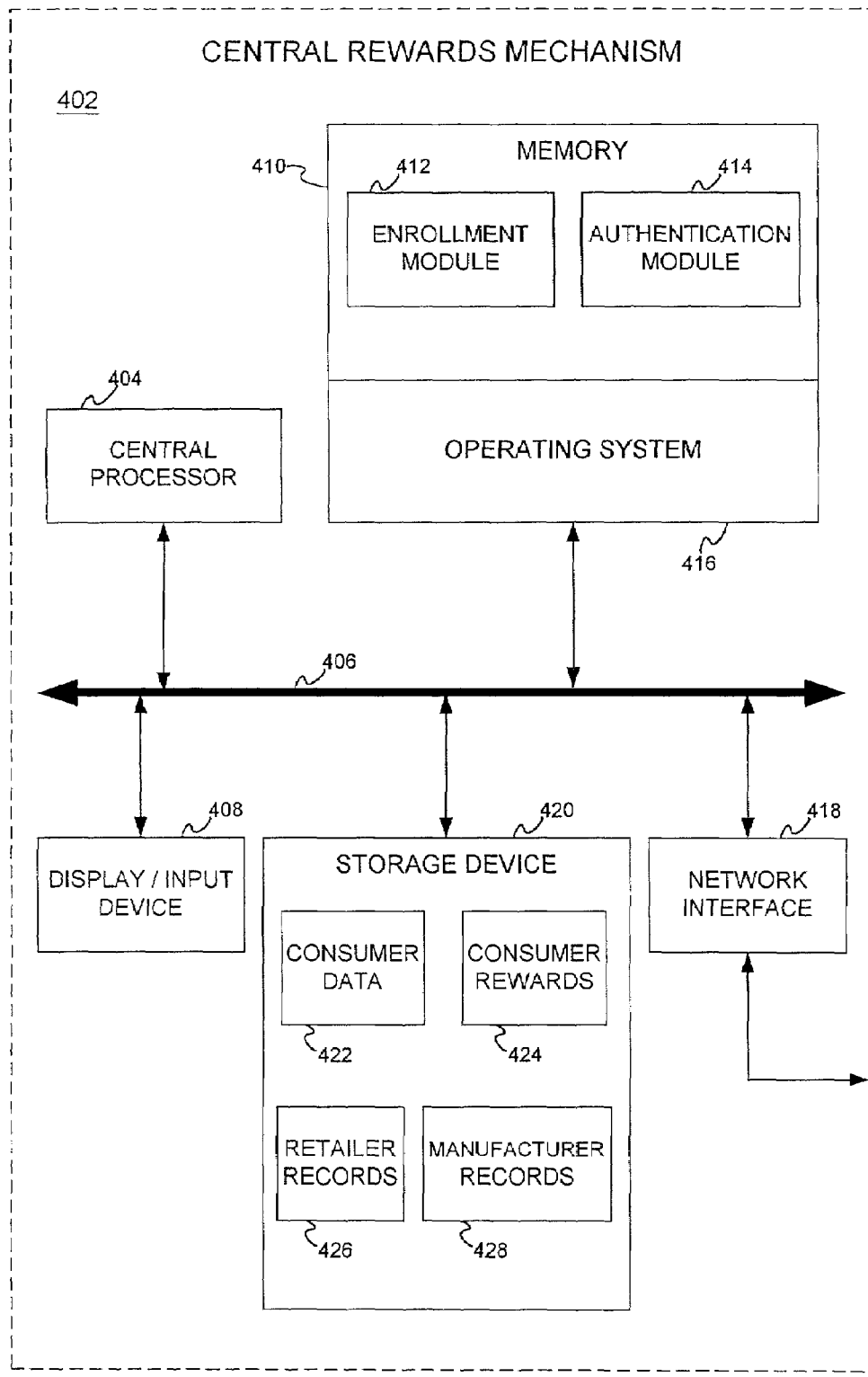
FIG. 4 is a schematic block diagram of an exemplary central rewards mechanism in accordance with the present invention.

With reference to FIG. 4, an exemplary central rewards mechanism 402 includes a central processor 404 in communication with other elements of the rewards mechanism 402 through a system interface or bus 406. A suitable display device/input device 408, such as a keyboard or pointing device in combination with a monitor, may be provided for receiving data from and outputting data to a user of the system. A memory 410, which is associated with the rewards mechanism 402, includes various software modules, such as an enrollment module 412 and an authentication module 414 for example. The memory 410 preferably further includes an operating system 416 which enables execution by central processor 404 of the various software applications residing at enrollment module 412 and authentication module 414. Operating system 416 may be any suitable operating system, as described above. Preferably, a network interface 418 is provided for suitably interfacing with other elements of the incentive awards system, such as the elements described above with reference to FIGS. 1-3.

Lastly, a storage device 420, such as a hard disk drive for example, preferably contains files or records which are accessed by the various software modules, such as enrollment module 412 and authentication module 414. In particular, consumer data 422 comprises information received from a consumer upon registration with the rewards mechanism 402. Consumer rewards 424 comprises data corresponding to each consumer's rewards account. Consumer rewards 424 may include cumulative rewards points totals as well as historical totals and rewards account activity over time. Retailer records 426 comprises information received from the various participating retailers. Manufacturer records 428 comprises information received from the various participating manufacturers. One skilled in the art will appreciate that the storage device 420 and, therefore, consumer data 422, consumer rewards 424, retailer records 426, and manufacturer records 428 may be co-located with the rewards mechanism 402 or may be remotely located with respect to the rewards mechanism 402. If the storage device 420 is remotely located with respect to the rewards mechanism 402, communication between storage device 420 and rewards mechanism 402 may be accomplished by any suitable communication link but is preferably accomplished through a private intranet or extranet.

Enrollment module 412 receives information from consumers, retailers, and/or manufacturers who wish to participate in the system. Enrollment module 412 accesses and stores information in storage device 420. Authentication and/or validation of the identity and status of participants, including any of the other system components, may be performed by the authentication module 414, which preferably has access to the records residing in storage device 420.

Figure 5:
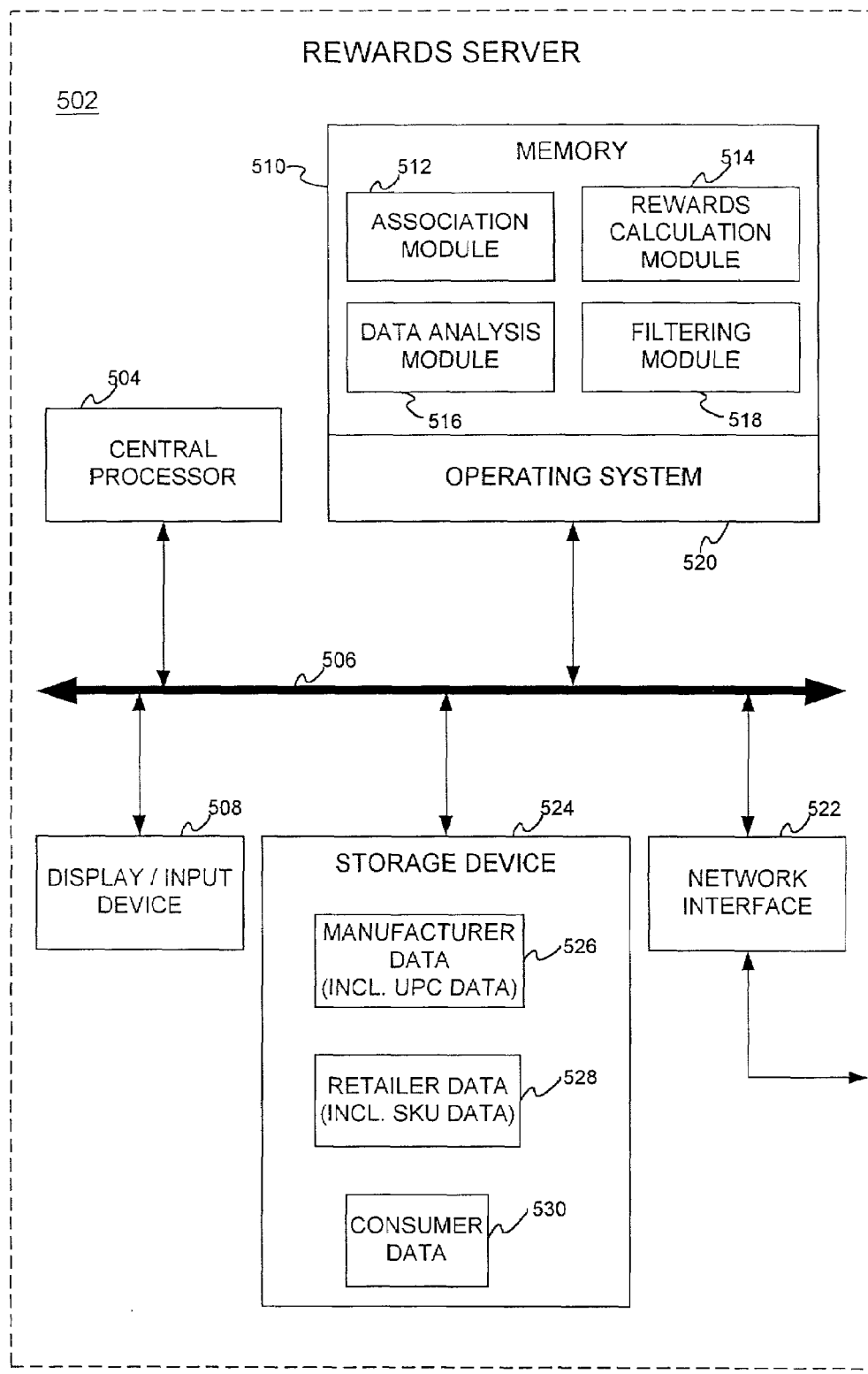
FIG. 5 is a schematic block diagram of an exemplary rewards server in accordance with the present invention.

With reference to FIG. 5, an exemplary rewards server 502 includes a central processor 504 in communication with other elements of the rewards server 502 through a system interface or bus 506. A suitable display device/input device 508, such as a keyboard or pointing device in combination with a monitor, may be provided for receiving data from and outputting data to a user of the system. A memory 510, which is associated with the rewards server 502, includes a variety of software modules, such as an association module 512, a rewards calculation module 514, a data analysis module 516, and a filtering module 518 for example. The memory 510 preferably further includes an operating system 520 which enables execution by central processor 504 of the various software applications residing at the various modules 512, 514, 516, and 518. Operating system 520 may be any suitable operating system, as described above. Preferably, a network interface 522 is provided for suitably interfacing with other elements of the incentive awards system, such as the elements described above with reference to FIGS. 1-3.

Lastly, a storage device 524, such as a database as described above for example, preferably contains files or records which are accessed by the various software modules 512, 514, 516, and 518. In particular, manufacturer data 526 comprises information received from a manufacturer, such as descriptions or other information regarding the manufacturer's products and/or services as well as UPC data for example. Retailer data 528 comprises information received from a retailer, such as descriptions or other information regarding the retailer's products and/or services as well as SKU data for example. Consumer data 530 comprises information pertaining to a consumer, including a consumer ID, purchase data, a consumer profile, and/or the like. One skilled in the art will appreciate that the storage device 524 and, therefore, manufacturer data 526, retailer data 528, and consumer data 530 may be co-located with the rewards server 502 or may be remotely located with respect to the rewards server 502. If the storage device 524 is remotely located with respect to the rewards server 502, communication between storage device 524 and rewards server 502 may be accomplished by any suitable communication link but is preferably accomplished through a private intranet or extranet.

Figure 6:
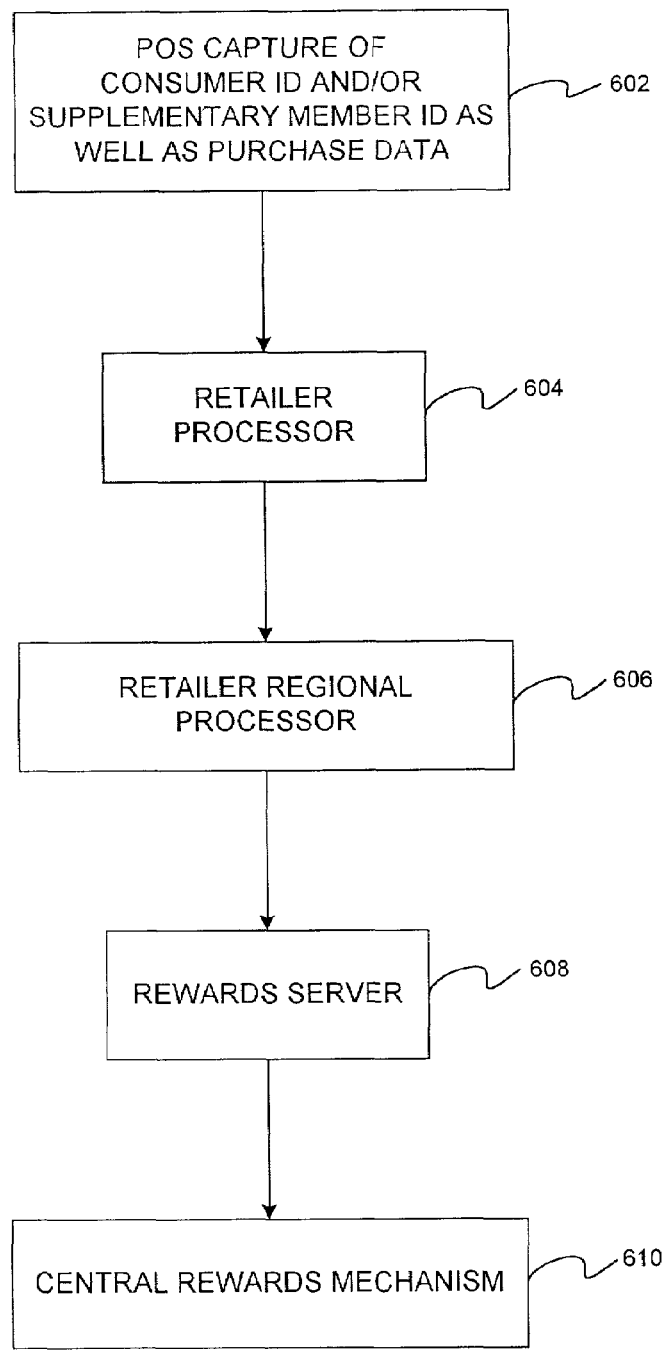
FIG. 6 is a flowchart illustrating an exemplary process for capturing and processing POS SKU data in accordance with the present invention.
Figure 7:
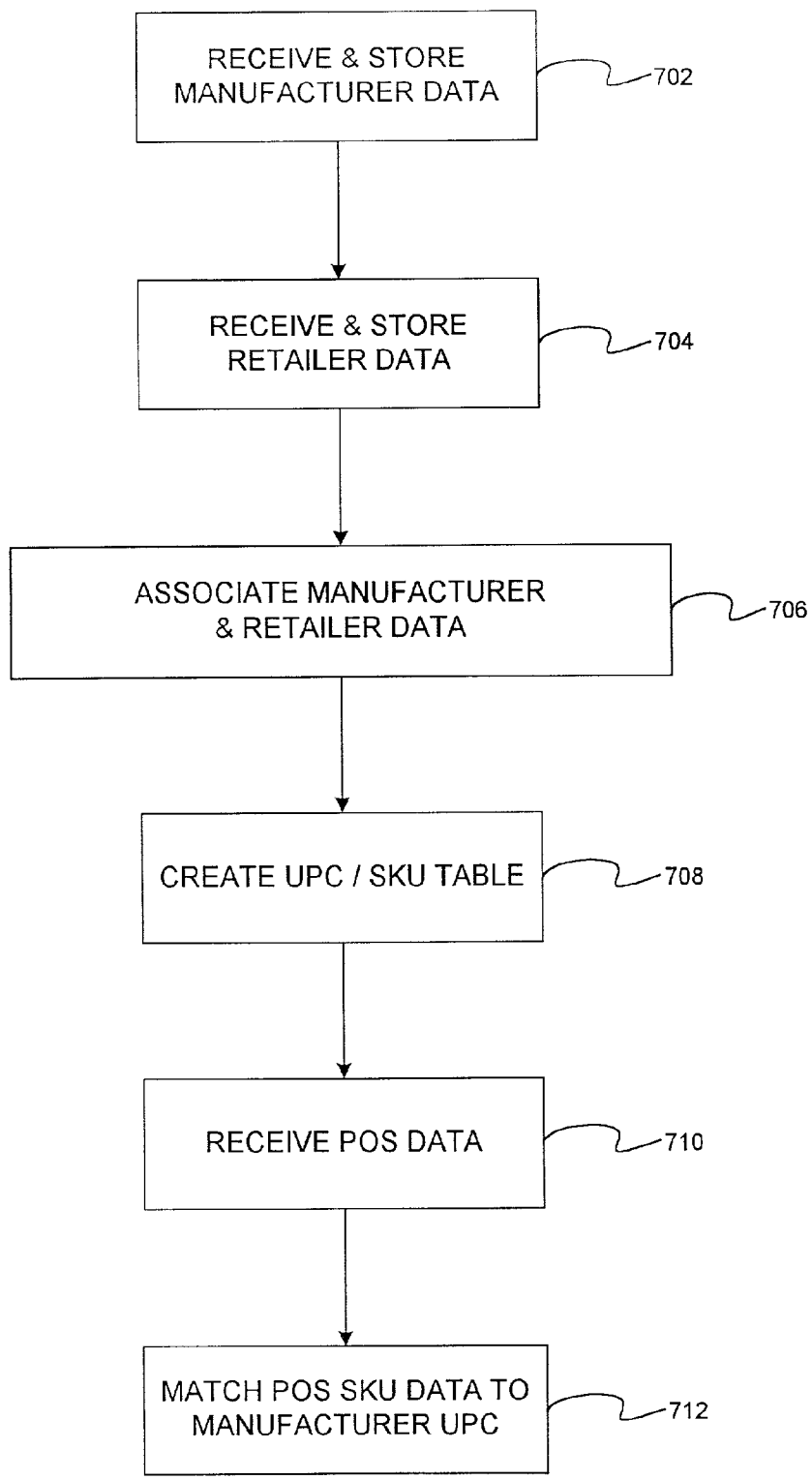
FIG. 7 is a flowchart illustrating an exemplary process for associating SKU data and UPC data in accordance with the present invention.

Referring next to FIGS. 6 and 7, the process flows depicted in these figures are merely exemplary embodiments of the invention and are not intended to limit the scope of the invention as described above. It will be appreciated that the following description makes appropriate reference not only to the steps depicted in FIGS. 6 and 7 but also to the various system components as described above with reference to FIGS. 1-3.

FIG. 6 is flowchart illustrating an exemplary process for capturing and processing POS SKU data in accordance with the present invention. The association or matching of UPC and SKU data begins with POS data capture (step 602). When a consumer presents a consumer ID to a retailer 104 at the time of purchasing an item from the retailer 104, the consumer ID is processed by a rewards terminal 116 that recognizes the consumer ID and identifies the consumer as a participant in the system 100. Purchase data is captured by the retailer POS terminal 112. Purchase data may include any of the following: a SKU number; a unit price; a total transaction price; the payment vehicle(s) used; a store ID which identifies the particular store location if a retailer operates more than one store; a department ID, if the store has multiple departments; the date of the transaction; the time of the transaction; the employee ID of the store clerk who facilitates the transaction; a POS terminal ID to identify the particular terminal conducting the transaction; any retailer-specific incentive program ID; and/or the like. The retailer POS terminal 112 creates a transaction file comprising the consumer data (including a consumer ID) and purchase data (including a SKU number associated with each item purchased), and the transaction file is then stored by the retailer processor 110 in database 111 (step 604).

The various transaction files may be consolidated by the retailer processor 110 and then forwarded to the retailer regional processor 114 (step 606) for further back-office and cumulative data analysis performed by retailer 104.

In an exemplary embodiment, the transaction file is transmitted by either of the retailer processor 110 or the retailer regional processor 114 to the rewards server 120 (step 608). The SKU information for each item included in the transaction file is then matched to or associated with corresponding UPC information which identifies the related manufacturer 106. An exemplary association process is illustrated in the flowchart of FIG. 7. Association of SKU and UPC data may be accomplished through any data association technique known and practiced in the art. For example, the association may be accomplished either manually or automatically. Automatic association techniques may include, for example, a database search, a database merge, GREP, AGREP, SQL, and/or the like.

In an exemplary embodiment, database 121 receives and stores manufacturer data, including UPC data, from manufacturer 106 (step 702). Database 121 also receives and stores retailer data, including SKU numbers, from retailer 104 (step 704). In an exemplary implementation, database 121 stores manufacturer data in a separate manufacturer data table for each participating manufacturer 106. Each manufacturer data table may comprise a plurality of fields, such as "UPC" and "product description" for example, and a plurality of records, each of which corresponds to an item offered by the participating manufacturer 106. In one embodiment, database 121 stores retailer data in a separate retailer data table for each participating retailer 104. Each retailer data table may comprise a plurality of fields, such as "SKU" and "product description", for example, and a plurality of records, each record corresponding to an item offered by a participating retailer 104.

Data from each of the manufacturer and the retailer data tables is then associated (step 706). The association step may be accomplished by a database merge function, for example, using a "key field" in each of the manufacturer and retailer data tables. A "key field" partitions the database according to the high-level class of objects defined by the key field. For example, a "product description" class may be designated as a key field in both the manufacturer data table and the retailer data table, and the two data tables may then be merged on the basis of the "product description" data in the key field. In this embodiment, the data corresponding to the key field in each of the merged data tables is preferably the same. That is, the product descriptions in the manufacturer data table matches the product descriptions in the retailer data table. However, manufacturer and retailer data tables having similar, though not identical, data in the key fields may also be merged by using AGREP, for example.

The result of the data association step is the creation of a separate data table, such as a UPC/SKU lookup table for example (step 708). Thus, when the rewards server 120 receives the data (e.g., consumer ID and SKU data) captured by the POS terminal (step 710), the rewards server 120 may search the UPC/SKU lookup table for the appropriate SKU number and then match the SKU to the corresponding UPC data (step 712). In an exemplary embodiment, the "SKU" and "UPC" fields in the UPC/SKU data table may be linked by an appropriate pointer. That is, when the rewards server 120 searches the UPC/SKU table and locates the particular SKU that has been captured and transmitted by the POS terminal, the specifically identified SKU datafield uses a pointer to direct the rewards server 120 to the UPC datafield that corresponds to that SKU number. In an exemplary embodiment, the UPC datafield may be linked by one or more additional pointers to other key fields, such as a consumer ID, a retailer ID, a manufacturer ID, and/or a third-party ID. These additional pointers may be used as means for compiling data which may be useful in any of the various data analyses performed by the rewards server 120. In this manner, the association of POS SKU numbers and UPC data may be used to create a context in which standardized, network-wide analyses may be conducted.

In an exemplary embodiment, the rewards server 120 utilizes the association information to calculate the rewards points generated by a consumer's purchase. For example, an appropriate series of pointers leading from a SKU to a UPC to a manufacturer ID may ultimately direct the rewards server 120 to employ a 2-for-1 manufacturer rewards ratio to award a consumer twice as many points as the dollar amount of the consumer's total transaction price. In another exemplary embodiment, an appropriate series of pointers may result in the calculation of rewards points based upon multiple rewards criteria, such as rewards criteria associated with the manufacturer of the item as well as rewards criteria associated with a third-party provider for example.

In a further embodiment, the rewards server 120 may use the association of UPC and SKU number data to analyze a variety of marketing variables across multiple manufacturers and retailers. For example, rewards server 120 may use a series of pointers leading from an SKU to a UPC and then to a "consumer profile" field or table to correlate, for instance, consumer spending behaviors, particular manufacturers, and/or specific products across multiple retailers for example.

In alternative embodiments, association of the UPC data and SKU number may take place at any of the rewards terminal 116, the retailer POS terminal 112, the retailer processor 110, the retailer regional processor 114 (or a retailer national processor), and/or the central rewards mechanism 102.

In one embodiment, the retailer 104 may offer an incentive or loyalty program that is independent from the program offered by the system 100. Alternatively, the retailer 104 may use the system's UPC data for its own internal purposes.

With momentary reference to FIG. 6, in one exemplary embodiment, the consumer ID and the earned rewards information are transmitted to the central rewards mechanism 102 after the rewards server 120 has filtered out consumer data associated with the consumer ID (step 610). In another embodiment, the central rewards mechanism 102 may use the captured and matched UPC information to determine rewards and/or for data analysis.

Figure 8:
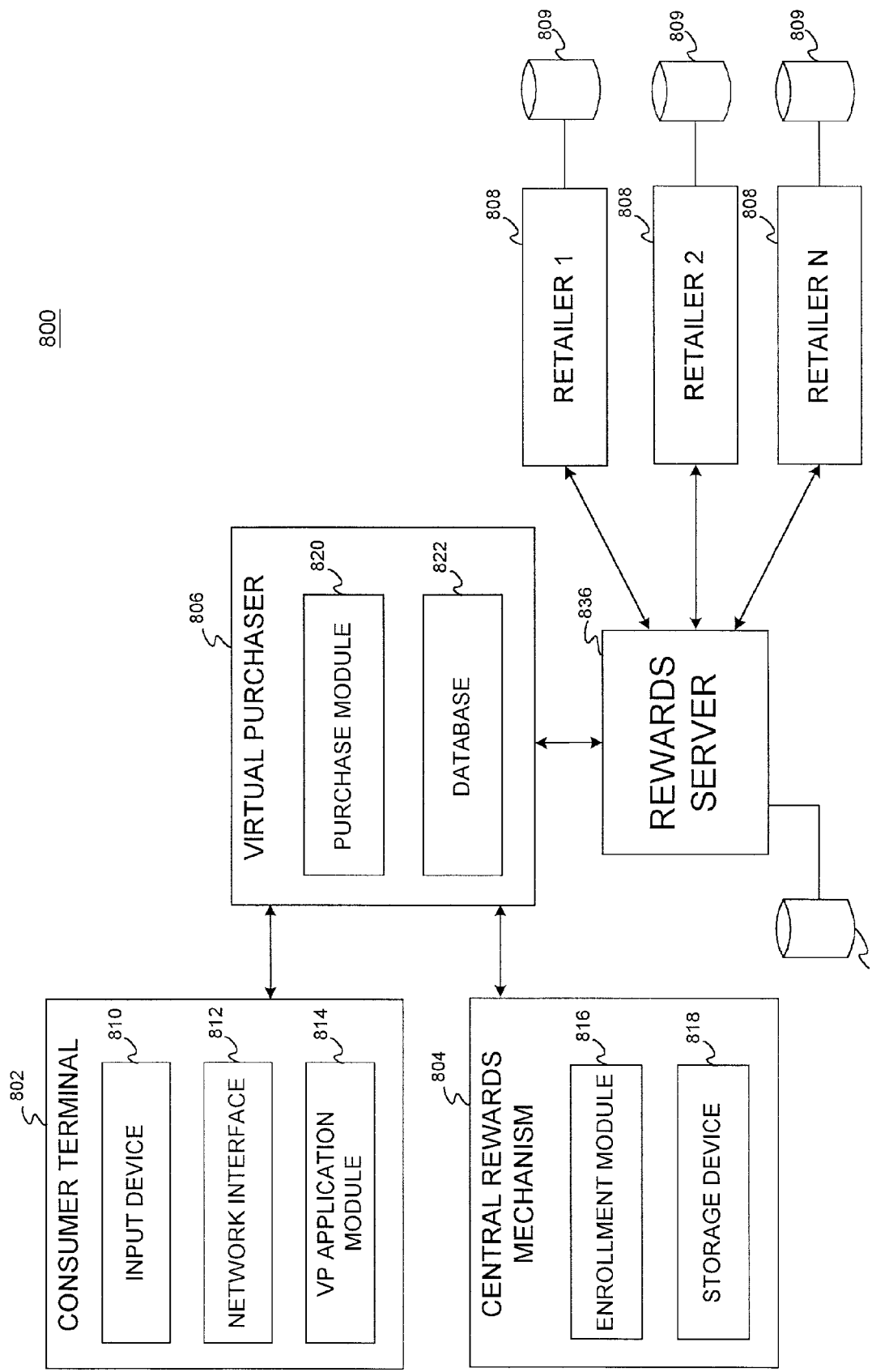
FIG. 8 is a schematic block diagram illustrating an exemplary virtual purchasing system in accordance with the invention.

In accordance with another aspect of the invention, FIG. 8 is an exemplary diagram illustrating an exemplary virtual purchasing system 800. Virtual purchasing system 800 creates a purchasing environment that combines the opportunity to physically inspect the goods that are offered for sale by "brick and mortar" retail establishments with the automation, convenience, and large selection offered by an online retail network. In an exemplary aspect, virtual purchasing system 800 facilitates a convenient purchasing environment which enables a consumer to select the particular goods that they wish to purchase, transmit data regarding the selected goods to a virtual purchaser, and then purchase the selected goods under perceived optimal conditions through the virtual purchaser. The perceived optimal conditions may include conditions such as lowest price, quickest estimated delivery time, or a preferred retailer, for example.

In the exemplary embodiment illustrated in FIG. 8, virtual purchasing system 800 comprises a consumer terminal 802, a central rewards mechanism 804, a virtual purchaser 806, and a retailer/merchant system 808. It will be appreciated that the system 800 may comprise any number of consumer terminals 802 and any number of retailer systems 808.

The consumer terminal 802 may be any remote terminal through which a consumer may access other aspects of the system 800. Consumer terminal 802 may comprise any of the input devices, computing units, or computing systems described above. In an exemplary aspect, consumer terminal 802 may be implemented in the form of an electronic handheld device or personal digital assistant, such as a Palm Pilot® available from Palm, Inc. (Santa Clara, Calif.), for example. Consumer terminal 802 communicates with the system 800 through any of the communications networks described above. In an exemplary aspect, consumer terminal 802 permits wireless communication with the system 800. In one embodiment, consumer terminal 802 may operate in real-time, as described above. In another embodiment, the consumer terminal 802 may operate in batch mode, as described above. In still a further embodiment, consumer terminal 802 operates in a manner which includes aspects of both real-time functionality and batch mode functionality.

In an exemplary aspect, consumer terminal 802 permits a consumer to engage multiple facets of the system 800 in an interactive online communications environment. The interactive online environment made available through consumer terminal 802 is an extension of the network-level system and is implemented in conjunction with other aspects of the system 800. In this context, a consumer may use consumer terminal 802 for a variety of purposes. In another exemplary aspect, consumer terminal 802 is adapted to input a retailer item identifier associated with an item located at a retailer's store and then communicate the retailer item identifier to virtual purchaser 806. In one embodiment, consumer terminal 802 comprises an input device 810; a network interface 812 which facilitates communication with the virtual purchaser 806; and a virtual purchaser (VP) application module 814.

Input device 810 may be any device that is capable of identifying a retailer item identifier. Input device 810 may be configured to communicate a retailer item identifier to consumer terminal 802 in real time or some time later. Input device 810 may be integrated with consumer terminal 802 or may be a separate component that is adapted to communicate with consumer terminal 802. Exemplary input devices may include devices for manually inputting a retailer item identifier (such as an alphanumeric keypad, for example) and devices for optically, electronically or digitally inputting a retailer item identifier (such as a bar code reader or scanner, for example).

In an exemplary embodiment, input device 810 includes a conventional bar code reader which is adapted to scan a retailer item identifier. In one embodiment, the bar code reader is integrated with, and is a part of, the consumer terminal 802. In this embodiment, the input device 810 is used to input a retail item identifier and then communicate the retail item identifier to consumer terminal 802 while, or soon after, reading the retail item identifier. In another embodiment, the bar code reader is a separate component (such as a wand or a pen for example). In this embodiment, input device 810 is configured to input and then store a retailer item identifier for later communication (e.g., downloading) to consumer terminal 802.

Network interface 812 may be any suitable interface for establishing a communications link between consumer terminal 802 and virtual purchaser 806 and may establish communication with virtual purchaser 806 by any of the communications means set forth in detail above. In one embodiment, network interface 812 facilitates wireless communication between consumer terminal 802 and virtual purchaser 806.

VP application module 814 is configured to facilitate interaction between consumer terminal 802 and virtual purchaser 806. After consumer terminal 802 receives a retailer item identifier from input device 810, VP application module 814 processes, stores, and/or communicates the retailer item identifier to virtual purchaser 806 via network interface 812.

The central rewards mechanism 804 is substantially similar to, and may comprise any of the components of, central rewards mechanism 102 and/or central rewards mechanism 402, as described above with reference to FIGS. 1-4. Moreover, central rewards mechanism 804 may be configured to include any of the functionality described above with reference to central rewards mechanism 102 and/or central rewards mechanism 402. In particular, central rewards mechanism 804 comprises an enrollment module 816, which is substantially similar to enrollment module 512 of FIG. 5, and a storage device 818, which is substantially similar to storage device 420 of FIG. 4. In one embodiment, enrollment module 816 receives consumer enrollment data from consumers and then processes and transmits the consumer enrollment data to storage device 818 for storage and future retrieval.

Figure 9:
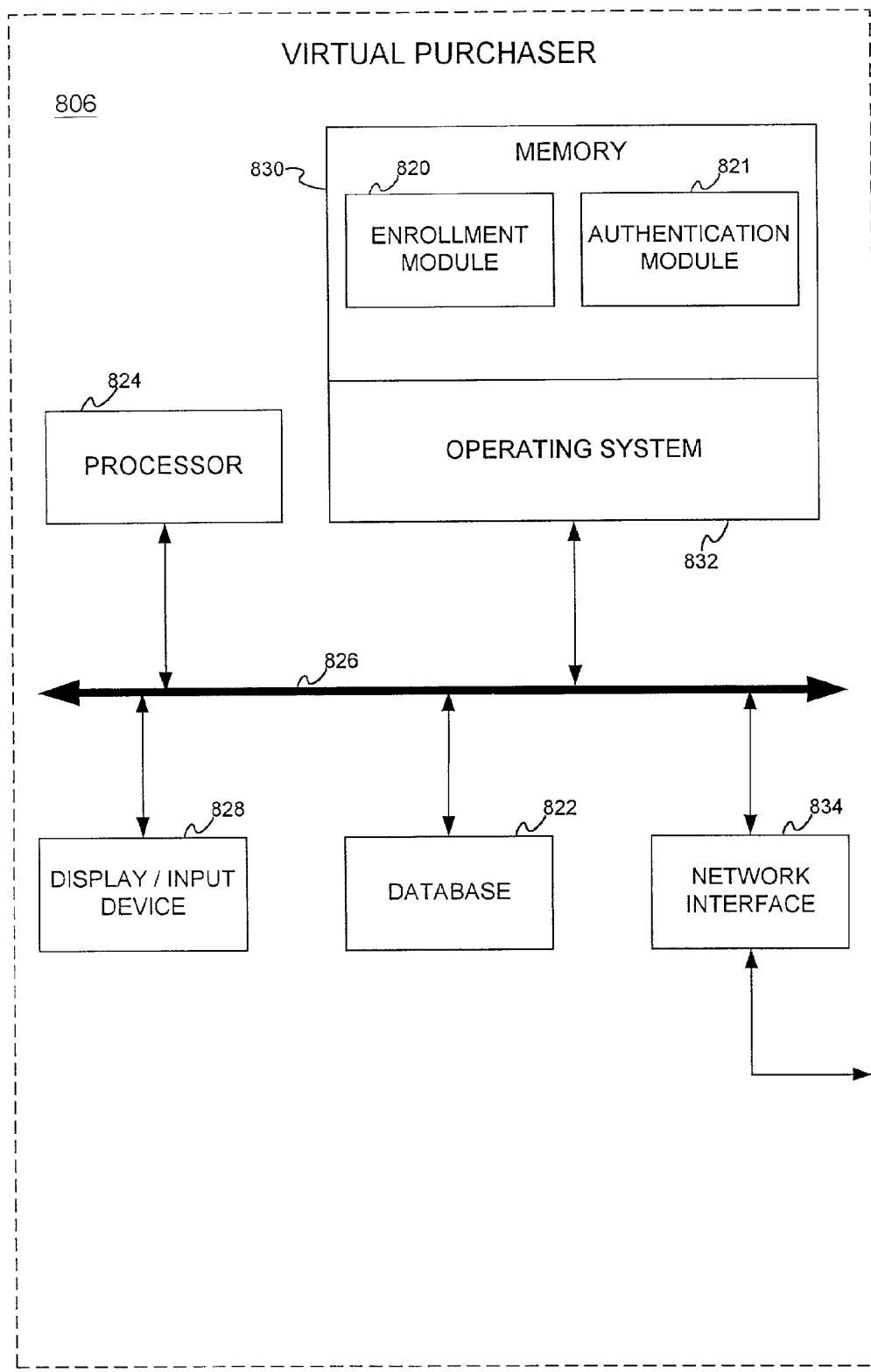
FIG. 9 is a schematic block diagram of an exemplary virtual purchaser in accordance with the invention.

In one embodiment, virtual purchaser 806 comprises a purchase module 820 and a database 822. As illustrated in FIG. 9, an exemplary virtual purchaser 806 further includes a processor 824 in communication with other elements of virtual purchaser 806 through an interface or bus 826. A suitable display/input device 828, such as a keyboard or pointing device in combination with a monitor, may be provided for receiving data from and outputting data to a user of virtual purchaser 806. A memory 830 associated with virtual purchaser 806 includes a purchase module 820. Memory 830 further includes an operating system 832 which enables execution by processor 824 of the software applications residing at purchase module 820. Operating system 832 may be any suitable operating system, as described above. The database 822 may be any type of database, such as relational, hierarchical, object-oriented, and/or the like. Common database products that may be used to implement database 822 include DB2 by IBM (White Plains, N.Y.), any of the database products available from Oracle Corporation (Redwood Shores, Calif.), any of the database products available from Sybase, Inc. (Emeryville, Calif.), Microsoft Access by Microsoft Corporation (Redmond, Wash.), or any other database product. In one embodiment, a network interface 834 is provided for facilitating the interface of virtual purchaser 806 with other elements of the virtual purchasing system 800, described herein with reference to FIG. 8.

In another embodiment, virtual purchaser 806 includes an authentication module 821 which facilitates the authentication and/or validation of the identity and/or status of consumers who seek access to virtual purchaser 806 through a consumer terminal 802. The authentication module 821 may have access to a suitable storage device, such as database 822 for example, which maintains records identifying authorized consumers.

Referring once again to FIG. 8, virtual purchasing system 800 further includes one or more retailer systems 808. The retailer system 808 is substantially similar to, and may comprise any of the components of, retailer system 104, as described above with reference to FIGS. 1, 2, and 3. Moreover, retailer system 808 may be configured to include any of the functionality described above with reference to retailer system 104. In an exemplary embodiment, the retailer system 808 is in communication with a database 809. Database 809 is substantially similar to, and may comprise any of the components and/or functionality of, database 111, as described above. In one embodiment, database 809 stores retailer item identifiers and related data, such as item descriptions and item prices for example.

The rewards server 836 is substantially similar to, and may comprise any of the components and/or functionality of, rewards server 120 and/or 502, as described above with reference to FIGS. 2, 3, and 5. In an exemplary embodiment, the rewards server 836 is in communication with a database 837. Database 837 is substantially similar to, and may comprise any of the components and/or functionality of, database 121, as described above. Although rewards server 836 is depicted in FIG. 8 as a separate component of system 800, in an alternate embodiment of the invention, the functionality of rewards server 836 is integrated with virtual purchaser 806.

Figure 10:
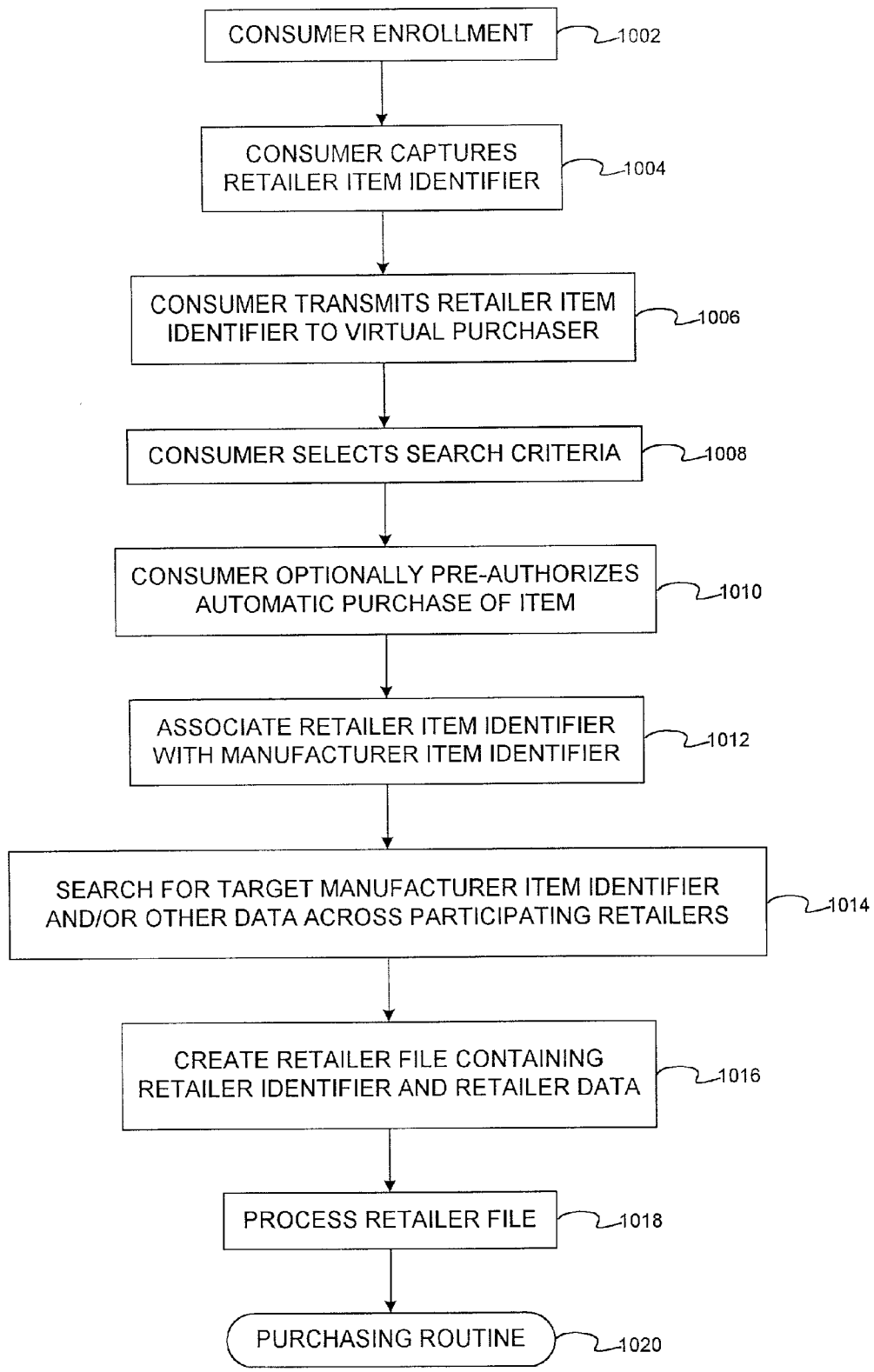
FIG. 10 is a flowchart illustrating an exemplary process for conducting a network-wide search for an item in accordance with the invention.
Figure 11:
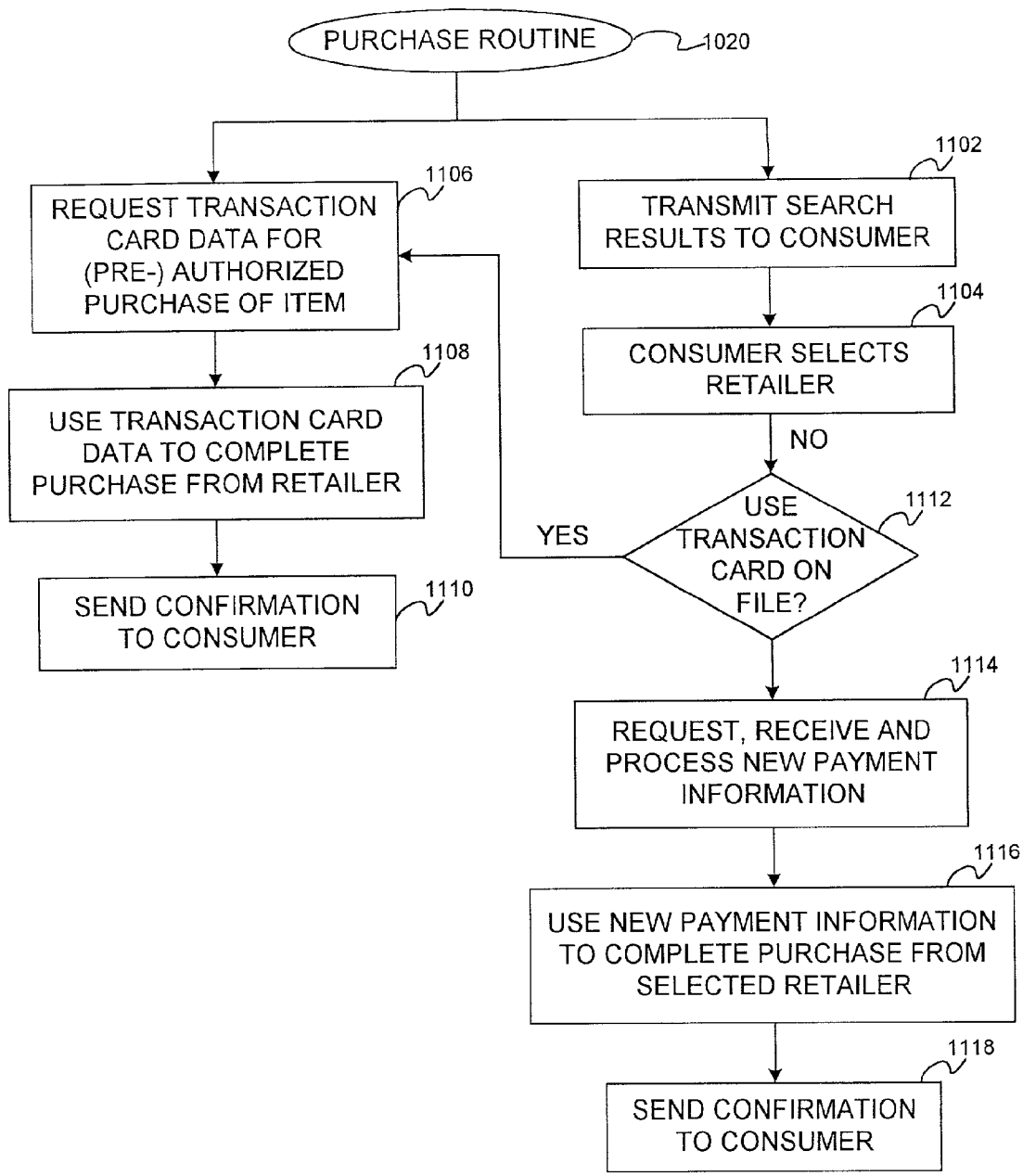
FIG. 11 is a flowchart illustrating an exemplary process for facilitating the purchase of an item located through the process of FIG. 10.

Referring next to FIGS. 10 and 11, the process flows depicted in these figures are merely exemplary embodiments of the invention and are not intended to limit the scope of the invention as described above. It will be appreciated that the following description makes appropriate reference not only to the steps depicted in FIGS. 10 and 11 but also to the various system components as described above with reference to FIGS. 8 and 9. FIG. 10 is flowchart illustrating an exemplary process for facilitating a search (for example, a network-wide search) for an item which corresponds to a given retailer item identifier. Conducting a network-wide search begins with enrolling a consumer in the system of the invention (step 1002). As described above, enrollment is accomplished by central rewards mechanism 804. That is, enrollment module 816 receives and processes the consumer enrollment data, facilitates issuance of a consumer ID to the consumer, and transmits the consumer enrollment data to storage device 818. After a consumer is enrolled in the system, the consumer may use the consumer ID when interacting with the virtual purchaser 806 and/or during a purchase transaction facilitated by virtual purchaser 806.

After a consumer has enrolled in the system of the invention, the consumer uses input device 810 to facilitate the capture, scan, read, or otherwise input of a retailer item identifier associated with an item located at a retailer store into consumer terminal 802 (step 1004). In one embodiment, the consumer terminal 802 is present at the retailer store and the retailer item identifier is input directly into consumer terminal 802. In another embodiment, input device 810 stores the retailer item identifier and then downloads the data to consumer terminal 802 at a later time. After consumer terminal 802 receives the retailer item identifier, consumer terminal 802 can facilitate establishing communications with virtual purchaser 806.

Once consumer terminal 802 contacts virtual purchaser 806, consumer terminal 802 facilitates transmission of a retailer item identifier to virtual purchaser 806 to facilitate a network-wide search for that item corresponding to the retailer item identifier (step 1006). In one embodiment, contacting virtual purchaser 806 includes using a consumer ID for identification of the consumer and/or for authorization to access the virtual purchaser 806. Once contacted, virtual purchaser 806 may request that the consumer select search criteria which virtual purchaser 806 may use to customize a network-wide search for items that correspond to the retailer item identifier transmitted by consumer terminal 802 (step 1008). In one embodiment, the requested search criteria may include any number of the following: an item description, an item price, a quantity of the item, a retailer name or identifier, a retailer location that is nearest the consumer, a consumer rating of items and/or retailers, lowest price available for the item, quickest estimated delivery time, a preferred retailer, and/or the like. In another embodiment, the consumer may select a set of master search criteria which are stored in database 822 as a default set of search criteria which is used by virtual purchaser 806 in subsequent searches requested by the consumer, unless in one embodiment the consumer overrides the master search criteria during a particular session. In this embodiment, the search criteria (i.e., master search criteria) may be selected and transmitted to the virtual purchaser 806 by the consumer prior to transmitting a particular retailer item identifier. In one embodiment, selection of consumer search criteria and/or master search criteria is facilitated by purchase module 820.

In another embodiment, the virtual purchaser 806 may permit the consumer to pre-authorize the virtual purchaser to facilitate automatic purchase of the item on behalf of the consumer, if the search results include an item which matches the consumer's specified search criteria (step 1010). In another embodiment, the virtual purchaser 806 permits the consumer to select a desired format for the search results, such as displaying all search results for the consumer or displaying some subset (e.g., retailers and/or items that exactly match the consumer's selection criteria) of the search results, for example.

After virtual purchaser 806 receives the retailer item identifier and receives any search criteria from the consumer terminal 802 (or accesses any master search criteria), the retail item identifier is translated or associated with a standard identifier, such as a manufacturer item identifier, for example (step 1012). The standard identifier can be used to search the network for the same or similar items that may be offered for sale by other retailers under different conditions and/or terms (i.e., conditions and/or terms that are perceived to be more favorable by the consumer, as determined by the search criteria).

In one embodiment, the virtual purchaser 806 facilitates transmission to the retailer item identifier and any search criteria to rewards server 836 to accomplish the association process. In this embodiment, the retailer item identifier (e.g., a SKU) is standardized to facilitate a search (e.g., local, with a category, network-wide, etc) for the item identified by the SKU. Standardization is accomplished by matching or associating the SKU information with a corresponding manufacturer item identifier (e.g., a UPC) which identifies the manufacturer of the item and/or a general description of the goods or services. Association of SKU and UPC data may be accomplished through any data association technique known and practiced in the art. For example, the association may be accomplished either manually or automatically. Automatic association techniques may be facilitated by, for example, a database search, a database merge, GREP, AGREP, SQL, and/or the like. An exemplary method for associating SKU and UPC data is described above with reference to FIG. 7.

In one embodiment, after associating the retailer item identifier with a manufacturer item identifier, rewards server 836 then uses the UPC data (target UPC) to facilitate a further search of database 837 (step 1014). This second search looks for the target UPC data across participating retailers whose data (e.g., retailer identifier, items available, descriptions of items available, item price, delivery information, and the like) is stored in database 837. As the rewards server 836 locates retailers associated with the target UPC data, rewards server 836 adds the relevant retailer identifier data, as well as any retailer data that may be relevant to the search criteria, to a retailer file (step 1016). If rewards server 836 is unable to sufficiently locate a certain number of retailers that are associated with the target UPC data (e.g., the item is not carried by other participating retailers or the item has been discontinued and is no longer carried by participating retailers), rewards server 836 may search database 837 for the item description that is associated with the target UPC data and the transmitted SKU. In this manner, rewards server 836 may locate items that are similar to the item desired by the consumer. In an alternate embodiment, depending on the search criteria provided by the consumer, rewards server 836 may conduct a search for similar items even though retailers carrying items associated with the target UPC have been located. Once the search is complete, the rewards server 836 then transmits the retailer file containing the retailer data to virtual purchaser 806. In one embodiment, virtual purchaser 806 receives and processes the retailer file in accordance with any applicable consumer search criteria, any search results formatting criteria, and/or any data relating to a pre-authorized automatic purchase of the item (step 1018).

After processing the retailer file, the virtual purchaser 806 enters a purchasing routine (step 1020). An exemplary purchasing routine is illustrated in FIG. 11. If the consumer has pre-authorized an automatic purchase, purchase module 820 effects the purchase on behalf of the consumer, as described in greater detail below. If the consumer has not pre-authorized an automatic purchase, virtual purchaser 806 transmits a list of the search results to consumer terminal 802 (step 1102). Upon receiving the search results, consumer terminal 802 may select a retailer from which the consumer wishes to purchase the requested item (step 1104).

If the consumer has pre-authorized the automatic purchase of the item, purchase module 820 facilitates the pre-authorized purchase for the consumer. In one embodiment, purchase module 820 requests transaction card information from central rewards mechanism 804 (step 1106). As described above, storage device 818 contains consumer enrollment data which includes transaction card information for the consumer. The transaction card information is transmitted from central rewards mechanism 802 to virtual purchaser 806, and purchase module 820 uses the transaction card information to complete a purchase transaction on behalf of the consumer with the retailer that satisfies the consumer's search criteria (step 1108). Once the purchase transaction is complete, virtual purchaser 806 sends a confirmation to the consumer terminal 802 indicating that the requested purchase has been made (step 1110). The confirmation may be in any suitable form, such as through an email, over the phone, or through the mail, for example, and may include any suitable information, such as information which indicates the retailer, the price, the particular item, the quantity, the delivery time frame, and/or the like.

If the consumer selects a retailer from which to purchase the item after viewing the search results, the purchase module 820 queries whether the consumer wishes to use the transaction card on file with the central rewards mechanism 804 (step 1112). If the consumer wishes to use the transaction card that is on file with the system, purchase module 820 completes the purchase transaction in the manner described above with reference to a pre-authorized purchase transaction (steps 1106 through 1110). If the consumer wishes to use an alternate method of payment, the purchase module requests, receives, and processes the new payment information (1114). Once the new payment information is received, the purchase transaction with the selected retailer is completed (step 1116), and confirmation is sent to the consumer as described above (step 1118).

In an exemplary embodiment, once the confirmation is sent to the consumer, the virtual purchaser 806 may also send an automatic reminder to the consumer as the delivery data approaches. In another embodiment, the virtual purchaser 806 may also provide automatic tracking of the shipment for the consumer.

Figure 12:
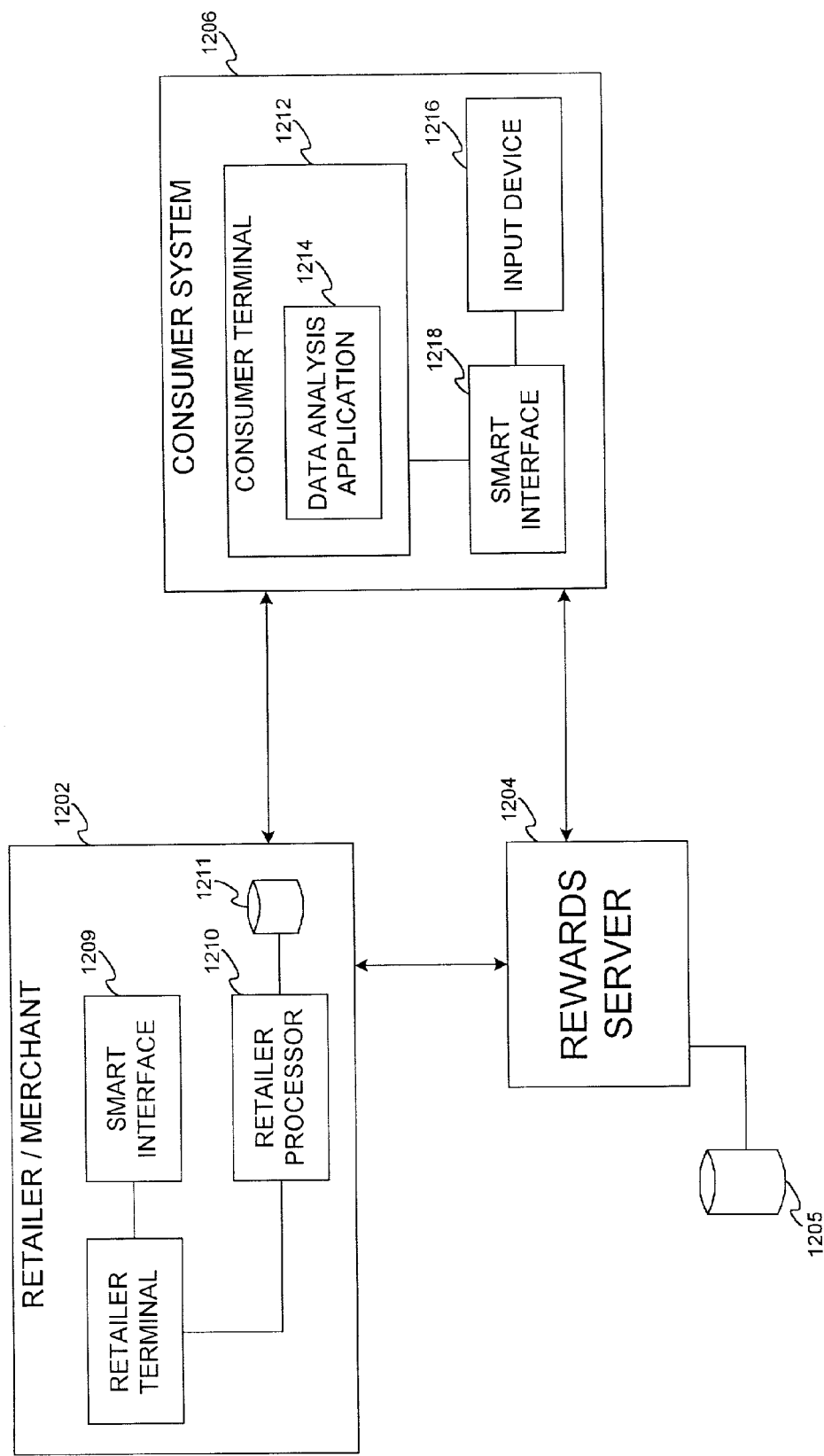
FIG. 12 is a schematic block diagram of an exemplary consumer purchasing analysis system in accordance with the invention.

In accordance with another aspect of the invention, FIG. 12 is a diagram illustrating an exemplary consumer purchasing analysis system 1200. Consumer purchasing analysis system 1200 may be used to analyze a consumer's purchasing behaviors, compare budgeted purchases with actual purchases, compare prices of various retailers, and generate reports which detail these analyses and therefore assist a consumer in managing their personal finances. The comprehensive nature of the data made available to a consumer through consumer purchasing analysis system 1200 permits network-wide, product-level knowledge of a consumer's specific purchasing patterns across retailers. The detailed tracking provided by consumer purchasing analysis system 1200 of a consumer's particular purchasing activities permits the consumer to analyze those activities and thereby achieve greater control over their personal financial situation.

In the exemplary embodiment illustrated in FIG. 12, consumer purchasing analysis system 1200 comprises a retailer/merchant system 1202, a reward server 1204, and a consumer system 1206. It will be appreciated that the system 1200 may comprise any number of retailer systems 1202 and any number of consumer systems 1206.

In an exemplary embodiment, the retailer system 1202 comprises a retailer terminal 1208, a smart interface 1209, and a retailer processor 1210. The retailer processor 1210 may be in communication with a database 1211. The retailer system 1202 is substantially similar to, and may comprise any of the components of, retailer system 104, as described above with reference to FIGS. 1-3. Moreover, retailer system 1202 may be configured to include any of the functionality described above with reference to retailer system 104. Retailer terminal 1208 is substantially similar to, and may comprise any of the components and/or functionality of, retailer terminal 108; retailer processor 1210 is substantially similar to, and may comprise any of the components and/or functionality of, retailer processor 110; and database 1211 is substantially similar to, and may comprise any of the components and/or functionality of, database 111. Smart interface 1209 is any device which is configured to interface with input device 1216. Exemplary smart interfaces include a smartcard reader, an RF reader, and an RF transceiver reader.

The rewards server 1204 is substantially similar to, and may comprise any of the components and/or functionality of, rewards server 120 and/or 502, as described above with reference to FIGS. 2, 3, and 5. In an exemplary embodiment, the rewards server 1204 is in communication with a database 1205. Database 1205 is substantially similar to, and may comprise any of the components and/or functionality of, database 121, as described above.

In an exemplary embodiment, the consumer system 1206 comprises a consumer terminal 1214 and an input device 1216. Optionally, consumer system 1206 may also include a smart interface 1218. Consumer terminal 1212 may be any remote terminal through which a consumer may access other aspects of the system 1200 and may comprise any of the input devices, computing units, or computing systems described herein. Further, consumer terminal 1212 communicates with the system 1200 through any of the communications networks described above. In an exemplary aspect, consumer terminal 1212 comprises a data analysis application 1214. Data analysis application 1214 may be any suitable application for analyzing data. Common data analysis products that may be used to implement data analysis application 1214 include Quicken® or any of the other products available from Intuit, Inc. (Mountain View, Calif.), Microsoft Money® by Microsoft Corporation (Redmond, Wash.), or any other data analysis product Smart interface 1218 is any device which is adapted to facilitate communication between input device 1216 and consumer terminal 1212 if components 1212 and 1216 are separate devices. Exemplary smart interfaces include a smartcard reader, an RF reader, and an RF transceiver reader.

Input device 1216 may be any device that is capable of receiving or uploading purchase data from a retailer system 1202. Input device 1216 may be configured to communicate the purchase data to consumer terminal 1212 in real time or some time later. Input device 1216 may be integrated with consumer terminal 1212 or may be a separate component that is adapted to communicate with consumer terminal 1212, such as through smart interface 1218. Exemplary input devices may include software, smartcards and smartcard readers, non-contact smart chip systems, read-write transponder systems, and other smart chip devices and related technology. In an exemplary aspect, input device 1216 is integrated with a consumer ID.

A number of standards have been developed to address general aspects of integrated circuit or smart cards, e.g.: *ISO 7816-1, Part 1: Physical characteristics* (1987); *ISO 7816-2, Part 2: Dimensions and location of the contacts* (1988); *ISO 7816-3, Part 3: Electronic signals and transmission protocols* (1989, Amd. 1 1992, Amd. 2 1994); *ISO 7816-4, Part 4: Inter-industry commands for interchange* (1995); *ISO 7816-5, Part 5: Numbering system and registration procedure for application identifiers* (1994, Amd. 1 1995); *ISO/IEC DIS 7816-6, Inter-industry data elements* (1995); *ISO/IEC WD 7816-7, Part 7: Enhanced inter-industry commands* (1995); and *ISO/IEC WD 7816-8, Part 8: Inter-industry security architecture* (1995). These standards are hereby incorporated by reference. Furthermore, general information regarding magnetic stripe cards and chip cards can be found in a number of standard texts, e.g., Zoreda & Oton, SMART CARDS (1994), and Rankl & Effing, SMART CARD HANDBOOK (1997), the contents of which are hereby incorporated by reference. For additional information regarding such cards, see, for example, application Ser. No. 09/522,628, filed Mar. 10, 2000, entitled "Methods and Apparatus for Authenticating the Download of Applets onto a Smartcard," which is hereby incorporated by reference. Additionally, for further information on Radio Frequency Identification (RFID) systems and their use in the context of read-write transponders, see, for example, the recently completed *ISO* 14443 standard, which specifies a standard form of communication for non-contact smart chips, and provisional application Ser. No. 60/304,216, filed Jul. 10, 2001, entitled "System and Method for RFID Payments", the contents of which are hereby incorporated by reference.

In an exemplary aspect, input device 1216 is a separate component of consumer system 1206 that is used to upload purchase data from a retailer system 1202 at the retailer's location and then download the purchase data to consumer terminal 1212 some time later through smart interface 1218. In one embodiment, input device 1216 includes a smartcard which is adapted to interface with retailer terminal 1208 through a smart interface 1209 that includes a smartcard reader. In another embodiment, input device 1216 includes a transponder which uses RFID to interact with smart interface 1209 without physically contacting smart interface 1209. In this embodiment, smart interface 1209 includes an RF reader or RF transceiver reader.

In another exemplary aspect, input device 1216 is integrated with consumer terminal 1212 and may be used to upload purchase data from retailer system 1202 to consumer terminal 1212 directly. In one embodiment, an integrated consumer terminal 1212 and input device 1216 may communicate with an online retailer system 1202 to receive purchase data from the online retailer system 1202. In another embodiment, consumer terminal 1212 may be a handheld electronic device, such as a personal digital assistant, which includes an integrated input device 1216 that is configured to interact with smart interface 1209 at the retailer's location.

Figure 13:
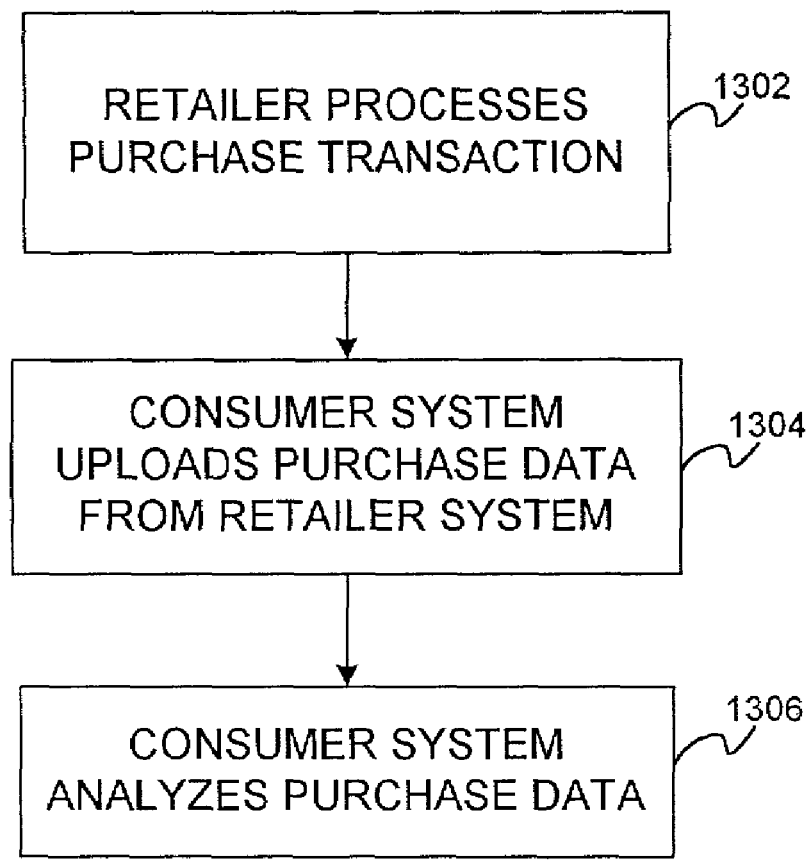
FIG. 13 is flowchart illustrating an exemplary process for obtaining a record of a consumer's purchasing activities.
Figure 14:
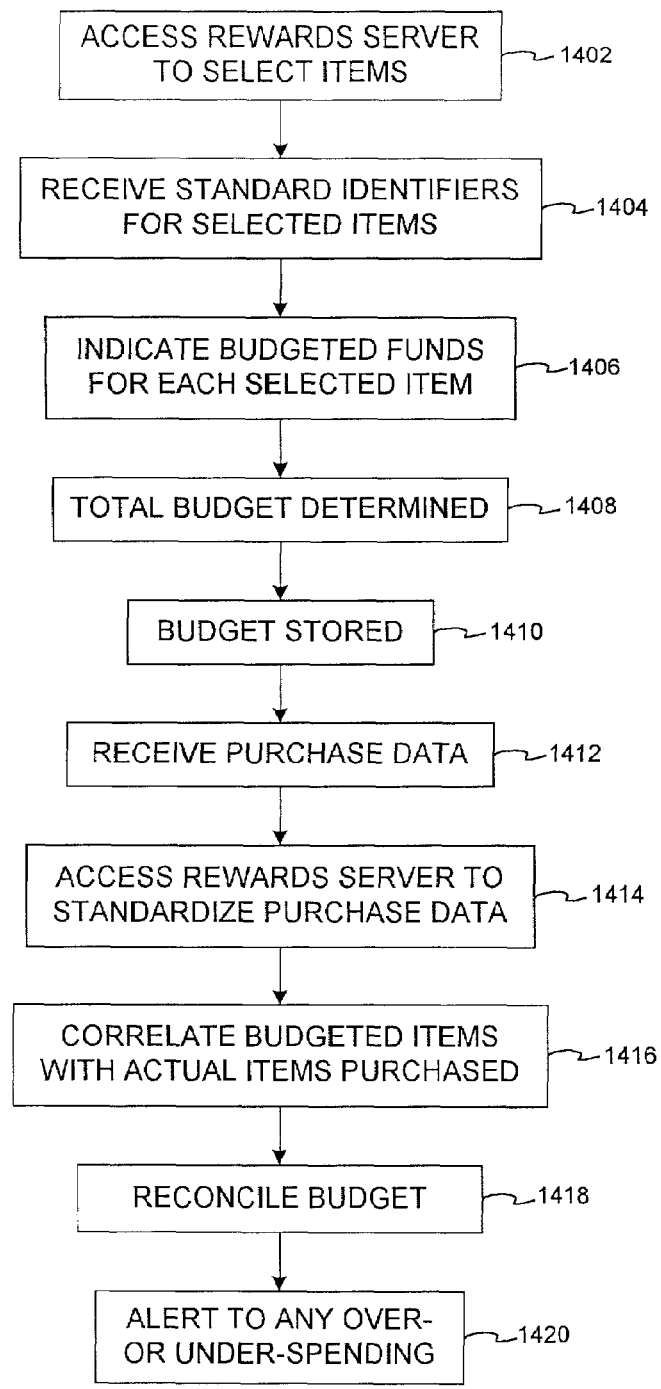
FIG. 14 is flowchart illustrating an exemplary process for analyzing a consumer's purchasing activities.

Referring next to FIGS. 13 and 14, the process flows depicted in these figures are merely exemplary embodiments of the invention and are not intended to limit the scope of the invention as described above. It will be appreciated that the following description makes appropriate reference not only to the steps depicted in FIGS. 13 and 14 but also to the various system components as described above with reference to FIG. 12.

FIG. 13 is flowchart illustrating an exemplary process for facilitating obtaining a record of a consumer's purchasing activities. Analyzing a consumer's purchasing activities may begin when a retailer terminal 1208 processes and records a consumer purchase transaction, either online (such as at a merchant web site for example) or off-line (such as at a retailer store for example) (step 1302). The consumer purchase transaction generates purchase data, such as any of the purchase data described above. In one embodiment, the purchase data may include a retailer item identifier, a retailer ID, and an item price. The consumer system 1206 receives (e.g., uploads) the purchase data from retailer system 1202 via input device 1216 (step 1304). The consumer system then analyzes the purchase data using data analysis application 1214 (step 1306).

FIG. 14 is a flowchart illustrating an exemplary process for analyzing a consumer's purchasing activities. In an exemplary aspect, consumer system 1206 communicates with rewards server 1204 to standardize the data used by data analysis application 1214. In one embodiment, a consumer communicates with rewards server 1204 while the consumer uses data analysis application 1214 to prepare a budget. The consumer accesses rewards server 1204 to select the various items that the consumer intends to purchase over the budget period (step 1402). The budget period may be for any predetermined period of time, such as a week, a month, six month, a year, etc.

In one embodiment, the rewards server 1204 facilitates item selection by designating items by product category (e.g., clothes, electronics, sports equipment, etc.) or by specific product (e.g., jeans, stereo, bicycle, etc.), including specific products by particular manufacturers. For each item selected by the consumer, rewards server 1204 transmits an appropriate standard identifier to consumer terminal 1212 (step 1404). If a consumer designates a selected item by product category, the rewards server 1204 transmits a standard identifier that corresponds to a product category that is associated with the retailer ID of retailers who sell items in that product category. If a consumer designates a selected item by specific product, the rewards server 1204 transmits a manufacturer item identifier (e.g., UPC) that corresponds to that specific product. The consumer then completes the budgeting process by indicating the amount of funds that the consumer intends to spend on each of the selected items (i.e., budgeted funds) (step 1406). The data analysis application 1214 then determines an amount of funds that corresponds to the total budget for the budget period (step 1408), and the established budget is stored by consumer terminal 1212 (step 1410). The consumer system 1206 may terminate the session with the rewards server 1204 any time after receiving the appropriate standard identifiers.

After the budget is established and stored by consumer terminal 1212, the consumer uses input device 1216 to transmit purchase data to consumer terminal 1212 (step 1412). In an exemplary embodiment, after the purchase data is transmitted to consumer terminal 1212, consumer system 1206 communicates with rewards server 1204 to standardize the purchase data (step 1414). Standardization of the purchase data may include facilitating the conversion of retailer item identifiers (e.g., SKUs) to manufacturer item identifiers (e.g., UPCs) to facilitate the reconciliation of actual purchases with the established budget. The conversion or association of SKU and UPC data is described above with reference to FIG. 7. After the purchase data is standardized and consumer terminal 1212 receives the appropriate standard identifiers, the purchase data is analyzed by data analysis application 1214.

In one aspect of the analysis, budgeted items and actual items are correlated with each other based upon the standard identifiers (step 1416). That is, a budgeted item that is designated by product category is correlated with an actual item that is associated with a retailer ID that corresponds to the appropriate product category. Likewise, a budgeted item that is designated by specific product is correlated with an actual item that is associated with a UPC that corresponds to that specific product. In one embodiment, the analysis performed by data analysis application 1214 may include a comparison of the established budget to actual purchase activity and/or a real-time or periodic reconciliation of budgeted items with actually purchased items (step 1418). A budget reconciliation may include displaying or printing a comparison of budgeted items and/or budgeted funds with actually purchased items and/or actual funds spent for a selected period (e.g., the budget period or any period within the budget period). In another embodiment, the analysis may include actual or projected cash flow analyses based upon the actual funds spent in a given period, for example.

In one embodiment, the analysis may include an alert when a budget reconciliation determines that over- or under-spending has occurred, including when over- or under-spending occurs in specific product categories or for specific products (step 1420). In this context, under-spending means that budgeted funds have not yet been spent. Moreover, the budget reconciliation includes a pre-set percentage or amount has been spent or not been spent in a category or over a set number of categories. In one embodiment, the consumer is alerted by consumer terminal 1212. In another embodiment, the consumer system 1206 transmits an alert to a third-party, such as a financial advisor for example.

In the foregoing specification, the invention has been described with reference to specific embodiments. However, it will be appreciated that various modifications and changes can be made without departing from the scope of the present invention as set forth in the claims below. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented in the claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

We claim:

1. A method for facilitating a purchase transaction, the method comprising,
   - receiving from a consumer a retailer item identifier, wherein said retailer item identifier is captured by a terminal of said consumer at a retailer location;
   - receiving from said consumer a search criteria related to said retailer item identifier, wherein said search criteria is at least one of: an item price, an item quantity, a second retailer, a second retailer location, a consumer rating, lowest price, and a delivery time;
   - associating said retailer item identifier with a first manufacturer item identifier directly corresponding to said retail item identifier;
   - conducting a first search for said first manufacturer item identifier across a plurality of retailers, wherein said first search is based on said search criteria;
   - associating said retail item identifier with a second manufacturer item identifier indirectly corresponding to said retail item identifier when said first search does not return any of said plurality of retailers directly corresponding to said first manufacturer item identifier;
   - conducting a second search for said second manufacturer item identifier across said plurality of retailers when said first search does not return any of said plurality of retailers directly corresponding to said manufacturer item identifier, wherein said second search is based on said search criteria; and,
   - facilitating a purchase transaction between said consumer and one of said plurality of retailers.

2. The method of claim 1, further comprising transmitting search results to said consumer.

3. The method of claim 1, wherein said search criteria comprises at least one of: an item description and a lowest price.

4. The method of claim 1, further comprising receiving a pre-authorization to automatically purchase an item from a retailer who satisfies said search criteria.

5. The method of claim 1, wherein facilitating a purchase transaction comprises retrieving a stored transaction card number.

6. A method for facilitating a purchase transaction, the method comprising,
   - receiving from a consumer a retailer item identifier, wherein said retailer item identifier is captured by a terminal of said consumer at a retailer location;
   - receiving from said consumer a search criteria related to said retailer item identifier, wherein said search criteria is at least one of: an item price, an item quantity, a second retailer, a second retailer location, a consumer rating, lowest price, and a delivery time;
   - associating said retailer item identifier with a first manufacturer item identifier directly corresponding to said retail item identifier;
   - conducting a first search for said first manufacturer item identifier across a plurality of retailers, wherein said first search is based on said search criteria;
   - associating said retail item identifier with a second manufacturer item identifier indirectly corresponding to said retail item identifier when said first search does not return any of said plurality of retailers directly corresponding to said manufacturer item identifier;
   - conducting a second search for said second manufacturer item identifier across said plurality of retailers when said first search does not return any of said plurality of retailers directly corresponding to said manufacturer item identifier, wherein said second search is based on said search criteria;
   - receiving from said consumer formatting criteria, wherein said formatting criteria;
   - formatting search results based on said formatting criteria; and,
   - transmitting said search results to said consumer.

* * * * *